United States Patent
Okada

(10) Patent No.: US 6,992,701 B2
(45) Date of Patent: Jan. 31, 2006

(54) REUSABLE DIGITAL CAMERA THAT PREVENTS UNAUTHORIZED USE

(75) Inventor: Hideo Okada, Uda-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 793 days.

(21) Appl. No.: 09/919,715

(22) Filed: Jul. 31, 2001

(65) Prior Publication Data

US 2002/0047904 A1    Apr. 25, 2002

(30) Foreign Application Priority Data

Aug. 1, 2000 (JP) ............................ 2000-233223
Sep. 14, 2000 (JP) ............................ 2000-279571

(51) Int. Cl.
H04N 5/232 (2006.01)
H04N 5/225 (2006.01)
H04N 5/222 (2006.01)
G06F 12/14 (2006.01)

(52) U.S. Cl. ................................ 348/211.3; 348/207.1; 348/333.04; 713/194

(58) Field of Classification Search ............. 348/207.1, 348/211.3, 231.1, 231.2, 231.3, 333.04; 713/193, 713/194; 229/102; 326/8; 455/410, 411; 109/21
See application file for complete search history.

(56) References Cited

U.S. PATENT DOCUMENTS 6,337,712 B1 * 1/2002 Shiota et al. ............. 348/231.1
6,374,310 B2 * 4/2002 Isomura ....................... 710/15
6,489,890 B1 * 12/2002 Inoue ........................ 340/568.1
6,571,271 B1 * 5/2003 Savitzky et al. ............. 709/200
6,650,831 B1 * 11/2003 Thompson ..................... 396/6
6,747,554 B1 * 6/2004 Higashimura et al. ...... 340/506

FOREIGN PATENT DOCUMENTS

| JP | 06311406 A | 11/1994 |
| JP | 07-219853 | 8/1995 |
| JP | 10-150523 | 6/1998 |
| JP | 10293727 A * | 11/1998 |
| JP | 11-004311 | 1/1999 |
| JP | 11-275421 | 10/1999 |
| JP | 2000-003437 | 1/2000 |
| JP | 2000-089388 | 3/2000 |
| JP | 2000134522 A * | 5/2000 |
| JP | 2000-228740 | 8/2000 |

OTHER PUBLICATIONS

Japanese Patent Office Action with English translation.
U.S. Appl. No. 09/727,049, filed Nov. 30, 2000, Hideo Okada et al.

* cited by examiner

*Primary Examiner*—Thai Tran
*Assistant Examiner*—John M. Villecco
(74) *Attorney, Agent, or Firm*—Edwards Angell Palmer & Dodge LLP; David G. Conlin; George W. Hartnell, III

(57) ABSTRACT

A reusable digital camera includes a memory storing a picked-up image, and a phototransistor provided in the camera to detect disassembly of the camera. When the user disassembles the digital camera in an unauthorized manner, the phototransistor detects outer light, and the picked-up image stored in the memory is erased. Thus, a digital camera is provided that prevents unauthorized disassembly or unauthorized access.

9 Claims, 22 Drawing Sheets

REUSABLE DIGITAL CAMERA THAT PREVENTS UNAUTHORIZED USE

BACKGROUND OF THE INVENTION

1. Field of the Invention

The present invention generally relates to a digital camera. More particularly, the present invention relates to a digital camera capable of being collected for reuse, collecting system thereof, and image viewing method.

2. Description of the Background Art

Conventionally, silver-salt analog cameras have been provided as image photographing means. As such analog cameras, inexpensive cameras of "film-with-lens" type are commercially available.

In recent years, digital cameras have been increasingly placed on the market. Images photographed with the digital cameras can be stored as digital data, making it possible to process the images or transfer them over a network such as the Internet. Accordingly, the digital cameras have been increasingly demanded.

Although the digital cameras have become popular for such reasons, those having a large number of pixels are required in order to obtain an image of as high quality as a picture of the analog cameras. However, such digital cameras having a large number of pixels are not readily available to ordinary users because of their high price.

In order to enable anyone to enjoy the function of such a digital camera at a low cost, a possible approach is to make the digital camera be usable over a number of times. In that case, however, reuse would be difficult if a user disassembles or uses the digital camera in an abusive manner or unauthorized manner.

When an image is picked-up by a camera, image quality of an object is sometimes degraded because of lens aberration, as the camera lens has its own inherent aberration including distortion aberration and chromatic aberration of magnification.

In order to correct the degradation in image quality resulting from the lens aberration, the image has been corrected at a mini lab or a processing station.

In addition to such aberration, some lenses may have unevenness in brightness, that is, the brightness differs from the central portion to the peripheral portion of the lens. In such a case, image correction appropriate for the lens has been necessary.

FIG. 20 is a block diagram showing a process of image correction in a conventional camera.

Referring to FIG. 20, when the camera is a silver salt type camera 110, a film 111 containing the images picked-up by the silver salt camera 110 is received by a mini lab 120. Here, film 111 is developed by a developing machine 121, focus adjustment and edge enhancement processes are performed on the image by an image correcting apparatus 122, and prints 130 are output.

FIG. 21 is a block diagram showing the image processing when a camera is the silver salt, APS (Advance Photo System) type camera 112.

Referring to FIG. 21, in a silver salt APS camera 112, it is possible to record lens information 114 of silver salt APS camera 112 on film 113. A user brings the film 113 having lens information 114 recorded thereon to a mini lab 125, where development process takes place. Here, mini lab 125 is a digital laboratory, and hence image correction is performed in a digital manner.

More specifically, film 113 is developed by developing machine 126, and image correction is performed by image correcting apparatus 127. At this time, image correction is performed using the data from correction information database 128, based on lens information 114. Thereafter, prints 131 are provided.

In the examples shown in FIGS. 20 and 21, images are not corrected on the recorded film. Further, image correction is possible only by an image correction supporting laboratory.

FIG. 22 is a block diagram showing the image correction process when the camera is a digital camera 115. Referring to FIG. 22, image data picked-up by digital camera 115 are stored in memory 116, and the user processes the data on a personal computer 140 of his/her own. Here, software and the like for image processing have been installed in personal computer 140, and by an image correcting program 141, the image taken out from the memory 116 is corrected, with a reference to a correction information database 142. Thereafter, the data are stored in a storage device 143 such as a memory or a hard disk, printed by a printer, and a photograph print out 144 is provided.

The image correcting process has been performed in the above described manner for various conventional cameras. In the case of silver salt camera and silver salt APS camera, the image correction is performed not on the film itself on which the image is stored. Further, correction has been possible only by an image correction supporting laboratory.

In the case of a digital camera, the necessity of image correction bothers the user. Further an image correction processing software is necessary for each camera, requiring considerable expense to obtain a desired corrected image.

SUMMARY OF THE INVENTION

The present invention was made to solve the above described problems, and an object is to provide a digital camera that can prevent abusive or unauthorized use.

Another object of the present invention is to provide an image processing apparatus that enables correction of an image picked-up by a digital camera at a low cost.

The present invention provides a digital camera, including an optical system, an image processing means for processing an image of an object input through the optical system, a memory storing photograph data resulting from the image processing, a housing box accommodating the optical system, the image processing means and the memory, detecting means for detecting disassembly of the housing box, and control means for performing a prescribed processing in response to a result of detection by the detecting means.

When the housing box containing main portions of the digital camera is disassembled, a prescribed process is performed. Therefore, the user does not dare to disassemble the digital camera in an abusive manner. As a result, a digital camera that can prevent unauthorized use can be provided.

Preferably, the prescribed processing is erasure of the recorded contents in the memory. When the digital camera is disassembled in an abusive manner against the normal handling procedure, the contents recorded in the memory are erased, and hence the picked-up data will be wasted. Therefore, the user does not dare to disassemble the camera in the abusive manner.

More preferably, the digital camera further includes means for transmitting the photograph data stored in the memory to a prescribed photograph data storage device through a network, and the photograph image stored in the photograph data storage device can be viewed by accessing the photograph data storage device over the network by using access data that is unique to each digital camera. The prescribed processing includes transmission of a prescribed signal to the prescribed photograph data storage device to give an alarm when the photograph image is viewed.

As an alarm is given when the photograph images stored in the photograph data storage device is viewed, the user avoids unauthorized use the next time.

According to another aspect, the present invention provides a digital camera, including an optical system, image processing means for processing an image of an object input through the optical system, a memory storing photograph data resulting from the image processing, and means for transmitting the photograph data stored in the memory to a prescribed photograph data storage device through a network. The means for transmitting the photograph data to a prescribed photograph data storage device through a network includes means for connecting the digital camera and a prescribed transmitting apparatus connected to the photograph data storing means. The digital camera further includes means for determining whether it is connected to the prescribed transmission apparatus, and means for erasing the photograph data stored in the memory, when it is determined by the determining means that it is not connected to the prescribed transmitting apparatus.

When it is determined that the prescribed transmitting apparatus is not connected, the picked-up image data stored in the memory is erased. Therefore, the user does not dare to connect an apparatus other than the prescribed transmitting apparatus.

According to a still further aspect, the present invention provides a digital camera, including an optical system, image processing means for processing an image of an object input through the optical system, a memory storing photograph data resulting from the image processing, and means for transmitting the photograph data stored in the memory to a prescribed photograph data storage device through a network. The means for transmitting the photograph data to a prescribed photograph data storage device through a network transmits the photograph data to the photograph data storage device in accordance with a prescribed protocol. The digital camera further includes means for determining whether the transmission of the photograph data is performed in accordance with the prescribed protocol, and means for erasing the photograph data stored in the memory, when the determining means determines that the transmission of the photograph data is not performed in accordance with the prescribed protocol.

When it is determined that transmission of the photograph data is performed not in accordance with a prescribed protocol, the photograph data stored in the memory is erased. Therefore, the user does not dare to make an unauthorized access.

Preferably, when the photograph data stored in the memory is erased by the erasing means, the fact of erasure is displayed on the photograph data storage device.

According to a still further aspect, the present invention provides a digital camera, including an optical system, image processing means for processing an image of an object input through the optical system, a memory storing photograph data resulting from the image processing, and means for transmitting the photograph data stored in the memory to a prescribed photograph data storage device through a network. The photograph image stored in the photograph data storage device can be viewed by accessing the photograph data storage device over the network by using access data that is unique to each digital camera. The digital camera further includes means for determining whether the photograph data storage device is accessed through an authorized procedure, and control means for performing a prescribed processing to discourage the user from an unauthorized use.

When the photograph data storage device is accessed not through the authorized procedure, a prescribed processing is done, and hence, the user does not dare to make an unauthorized access thereafter.

Preferably, the prescribed processing is erasure of the recorded contents of the memory.

More preferably, the prescribed processing includes transmission of a prescribed signal to the prescribed photograph data storage device to give an alarm when the photograph image is viewed.

According to a still further aspect, the present invention provides an image processing apparatus connected to a network and provided in an image station allowing viewing of an image picked-up by a digital camera.

The image processing apparatus includes means for storing an optical characteristic of a lens of the digital camera, means for receiving image data picked-up by using the digital camera, and means for correcting the optical characteristic of the image data.

The image data of the digital camera is transmitted to a prescribed image processing apparatus, and the image processing apparatus stores the optical characteristic of the lens of the digital camera and performs correction of the optical characteristic of the lens on the picked-up image data. Therefore, the picked-up image can be corrected reliably at a low cost, without requiring a separate special software or the like.

Here, the optical characteristic of the lens includes lens aberration and unevenness of brightness.

Further, it is preferred that the digital camera can be circulated for reuse.

More specifically, even when the lens has any defect including aberration or uneven brightness, correcting process necessary for the image data picked-up using the lens is performed. Therefore, it is unnecessary to use an expensive optical lens having minimum aberrations that is generally used. Therefore, an inexpensive digital camera can be provided. Further, as the correction is done automatically, it is possible for the user to view the image of high quality, not bothered by the necessity of image correction.

According to a still further aspect, the present invention provides an image processing apparatus connected to a network station and provided in an image station allowing viewing of an image picked-up by a digital camera. The digital camera has a unique identification number, and the image processing apparatus includes a database storing an optical characteristic of a lens corresponding to the unique identification number, means for extracting the optical characteristic of the lens corresponding to the unique identification number of the camera from the database, means for receiving image data picked-up by using the digital camera, and means for correcting said optical characteristic on the image data, based on the extracted optical characteristic.

The image data picked-up by the digital camera is transmitted to a prescribed image processing apparatus, optical characteristic of the corresponding lens is extracted from a database storing the optical characteristic of the lens corresponding to a unique identification number of the digital camera, and the optical characteristic of the image data is corrected, based on the extracted optical characteristic. As a result, it is possible to correct the picked-up image at a low cost.

According to a still further aspect, the present invention provides an image processing apparatus used in a system allowing viewing of an image picked-up by a digital camera over a network. The digital camera is collected through a prescribed distribution center. The image processing apparatus is provided in the distribution center, and includes means for storing an optical characteristic of a lens of the digital camera, means for receiving image data picked-up by using the digital camera, and means for correcting the optical characteristic on the image data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the accompanying drawings.

Figure 1A:
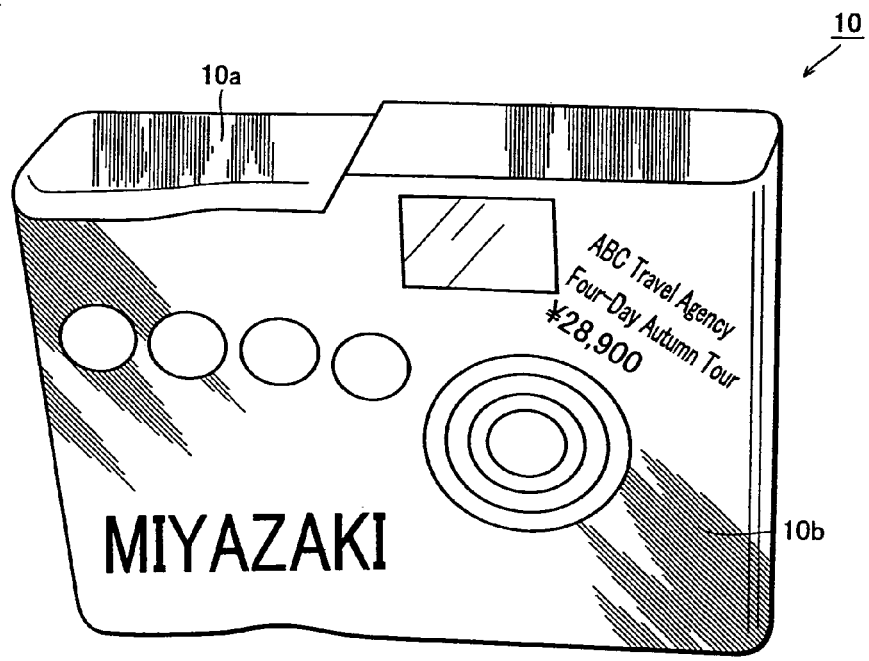
FIGS. 1A and 1B are perspective views showing the appearance of a digital camera.

Referring to FIG. 1A, a digital camera 10 includes a camera body 10a and an outer-housing portion 10b covering the camera body 10a. Referring to FIG. 1A, the name of a tourist site, for example, may be displayed on the front of the outer-housing portion 10b for advertisement.

In the present invention, images photographed with the digital camera 10 are viewed by accessing a predetermined URL (Uniform Resource Locator) over a network such as the Internet after returning the used digital camera 10, as described later in detail.

Figure 1B:
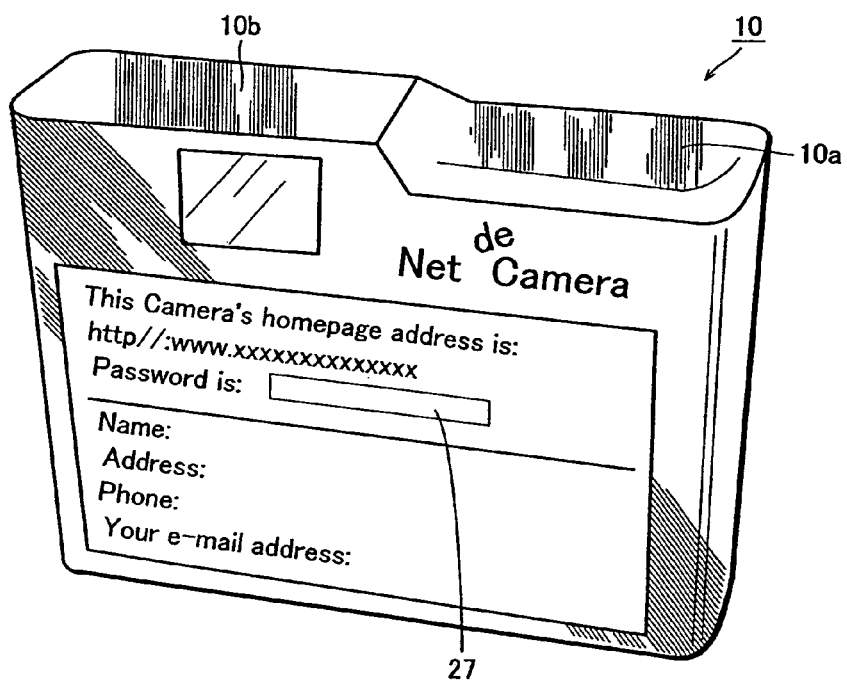

Referring to FIG. 1B, URL and password 27 for accessing the photographed images are indicated on the back of the digital camera 10. Note that each digital camera 10 has a different password 27, and the password 27 is recorded on the outer-housing portion 10b of the digital camera 10 in an invisible manner like, e.g., a scratch card. The scratch portion recording the password may be of a duplicate type, so that one can be kept by the user when returning the digital camera 10, and the other attached to the digital camera 10 can be kept by the side collecting the digital camera 10 as described later.

Note that a caution against disassembling the camera may be printed on top of the outer-housing portion 10b of the digital camera 10. Processing such as erasing the stored data in a built-in memory 18 is conducted if the digital camera 10 is disassembled. Therefore, such a caution is displayed as preventive measures thereof.

Figures 2A, 2B:
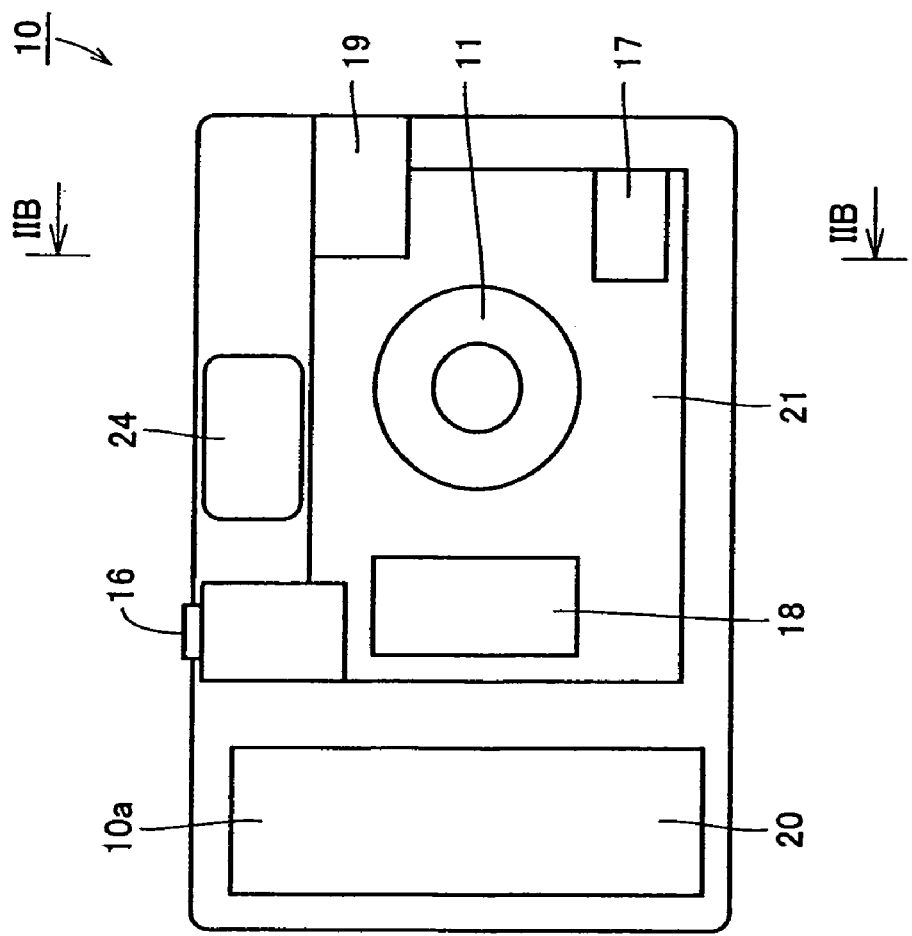
FIGS. 2A and 2B are schematic diagrams representing internal structure of the digital camera.

FIGS. 2A and 2B are schematic diagrams showing an internal structure of the digital camera 10 of FIG. 1. FIG. 2A is a front view, and FIG. 2B is a cross-sectional view taken along the line IIB—IIB of FIG. 2A. Referring to FIGS. 2A and 2B, the digital camera 10 includes a lens 11 for photographing an object, a viewfinder 24 for checking the object to be photographed, a shutter 16, a phototransistor 17 for sensing whether the digital camera 10 has been disassembled or not based on incident light, a flash memory 18 for storing a photographed image, and a battery 20 serving as a driving source of the digital camera 10. The battery 20 can be easily removed and replaced with a new one by removing the outer-housing portion 10b. The digital camera 10 is provided with a transmitting terminal 19 that is described later.

Figure 3C:
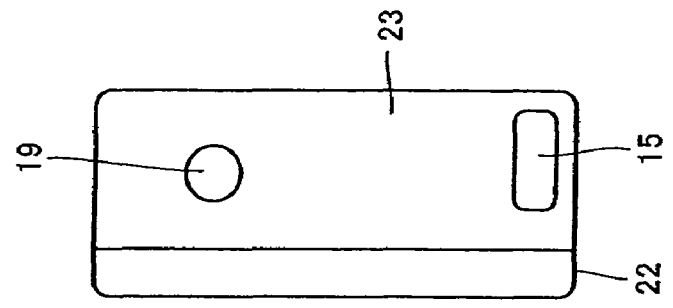
FIGS. 3A to 3C are illustrations showing external structure of the digital camera.
Figure 3A:
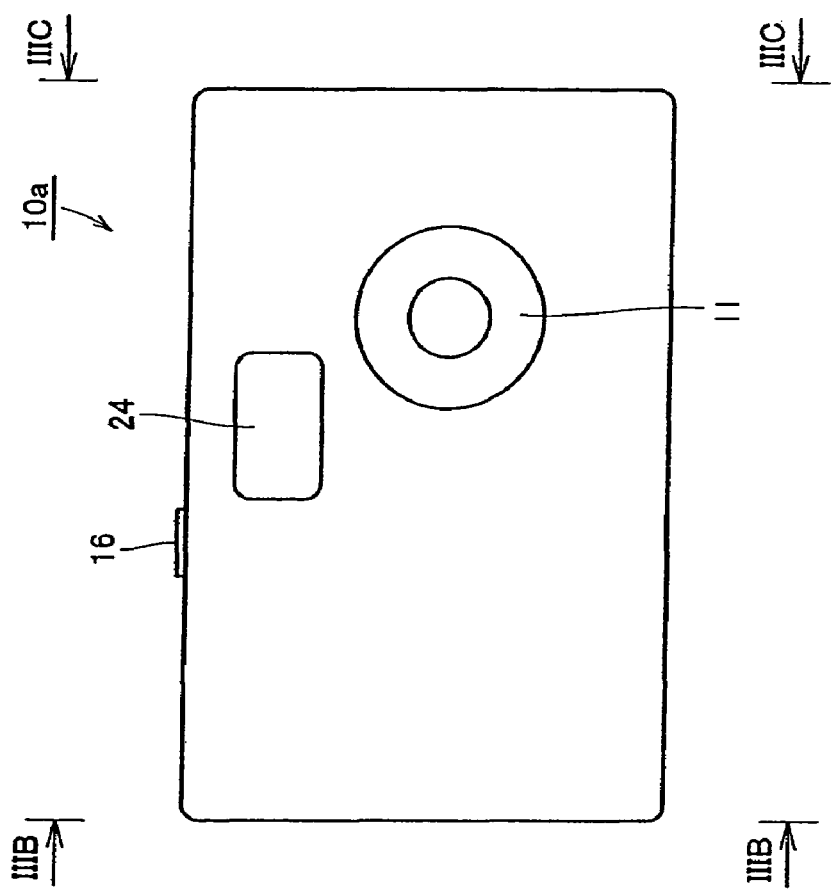
Figure 3B:
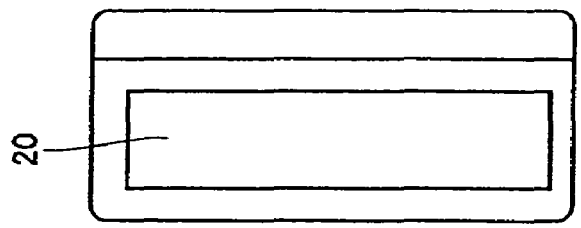

FIG. 3A is a front view of the digital camera body 10a, FIG. 3B is a left side view along the line IIIB—IIIB of FIG. 3A, and FIG. 3C is a right side view along the line IIIC—IIIC of FIG. 3A. The digital camera 10 is formed by engaging an upper cabinet 22 provided with the lens 11 with a lower cabinet 23 having the URL and the like displayed thereon. A main switch 15 for starting the operation of the digital camera 10 and the transmitting terminal 19 are provided on the right side of the digital camera body 10a.

Figure 4:
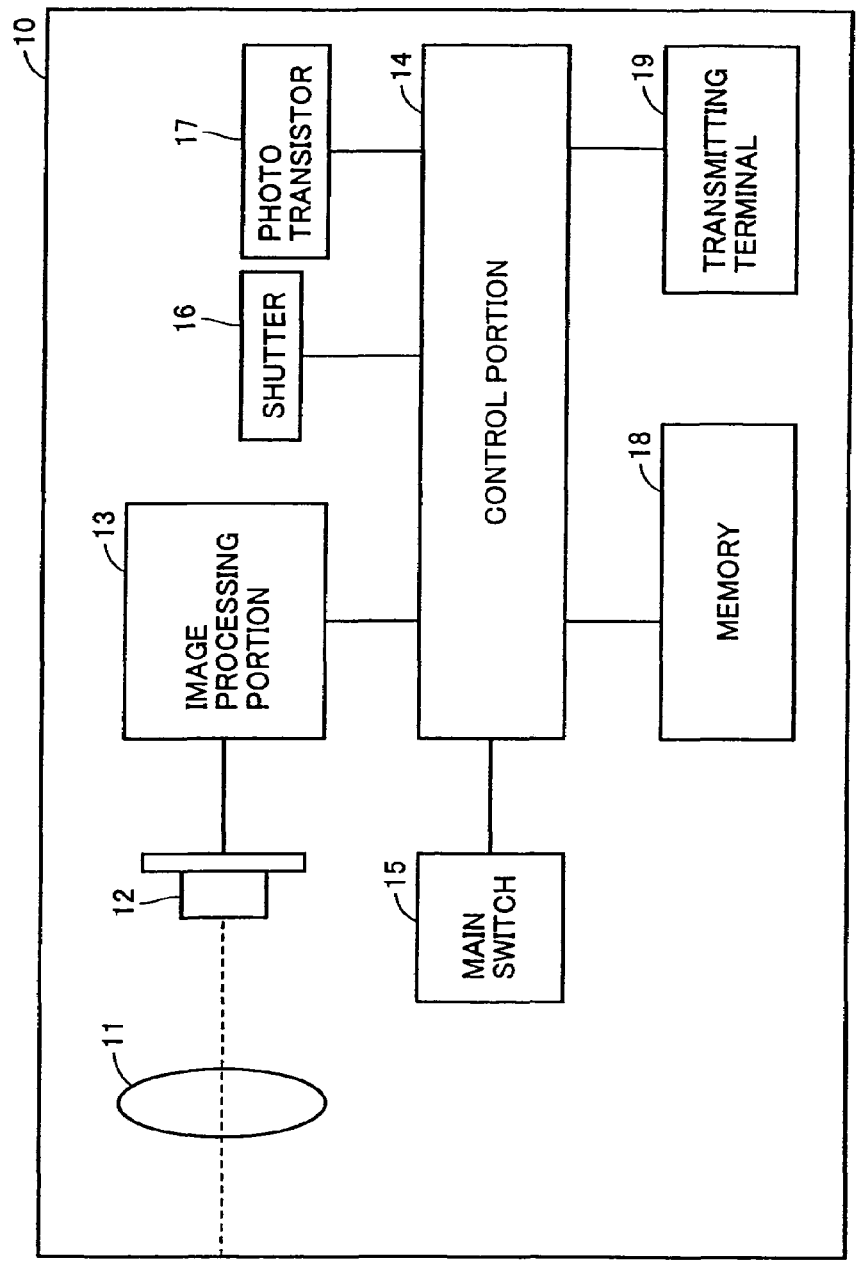
FIG. 4 is a block diagram showing a main portion of the digital camera.

FIG. 4 is a block diagram showing a main part of the digital camera 10. Referring to FIG. 4, the digital camera 10 includes a CCD (Charge Coupled Device) 12 for photographing an object image incident through the lens 11, an image processing portion 13 connected to the CCD 12 for processing the photographed image data, a control portion 14 for controlling the whole digital camera 10, the shutter 16, the phototransistor 17, the main switch 15, the memory 18 and the transmitting terminal 19.

Herein, the CCD 12 has 680,000 pixels, and the memory 18 is a 4-MB flash memory. However, specification of the digital camera 10 is not limited to this, and the digital camera 10 may have any desired specification.

Lens 11 is generally a mono-focus type lens, and it has a distortion aberration, chromatic aberration of magnification, unevenness in brightness and so on, that are unique to the lens. The lens, however, is not limited to the one described above. For example, it may be a lens that can be exchangeable with a wide angle lens or a telephoto lens. Alternatively, it may be a zoom lens, of which focal length is variable.

Hereinafter, the control flow of the digital camera 10 will be described. First, the digital camera 10 enters the standby mode in response to turning-on of the main switch 15. The standby mode is a state in which the digital camera 10 is ready to obtain an image, and in this mode, the battery 20 supplies power to the CCD 12, shutter 16, image processing portion 13, memory 18 and control portion 14 which are required to obtain an image. An image is photographed in response to turning-on of the shutter 16 in this state.

The photographed image data of a not-shown object are recorded on the memory 18 through the lens 11, CCD 12, image processing portion 13 and control portion 14. This image is stored in the memory 18 in a JPEG (Joint Photographic Expert Group)-compressed form.

Figure 5:
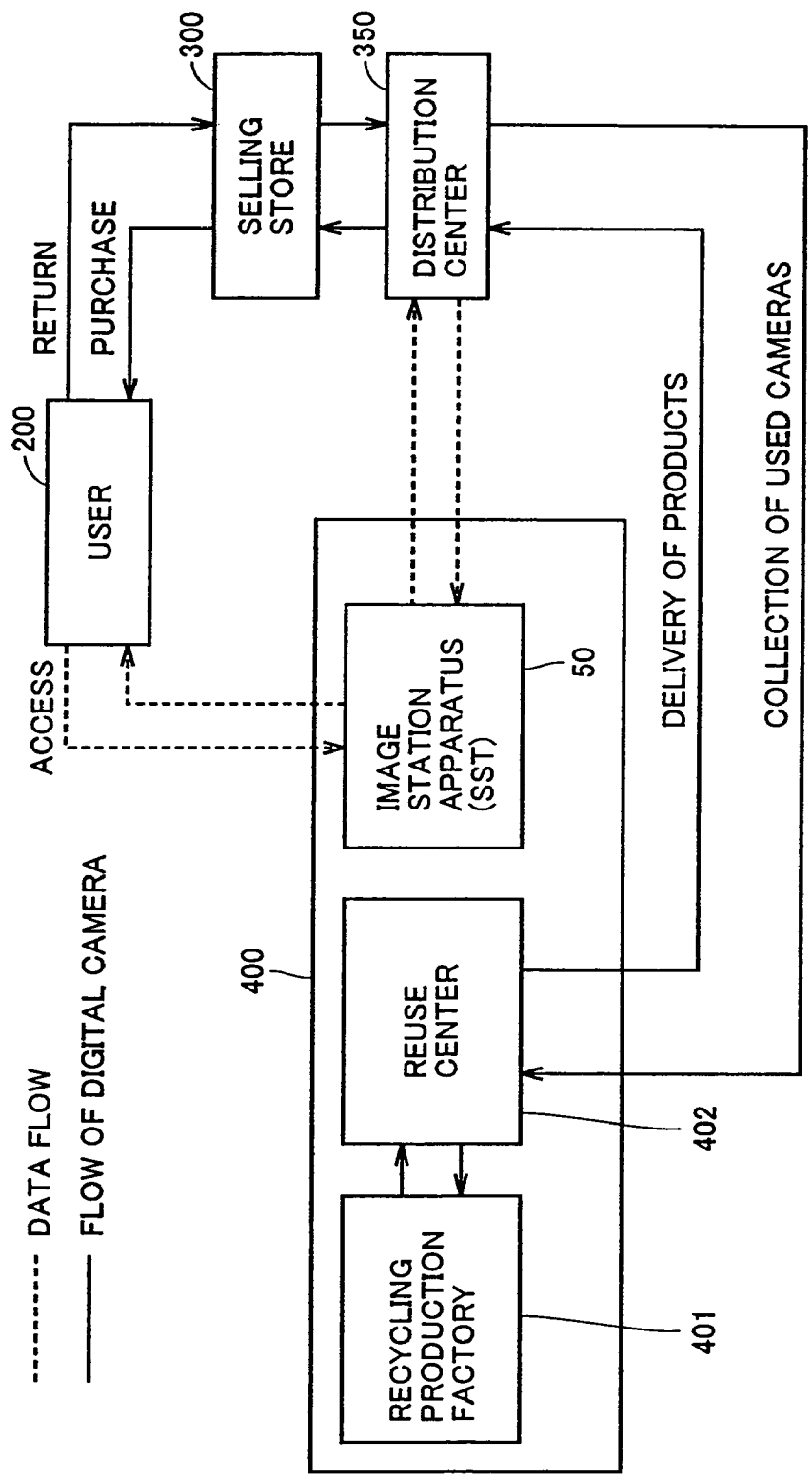
FIG. 5 is a schematic diagram showing an overall configuration of a digital camera collecting system to which the present invention is applied.

FIG. 5 is a schematic diagram illustrating a distribution/service system of the digital camera 10 according to the present invention. Referring to FIG. 5, the solid lines indicate the flow of the digital camera 10, and the dotted lines indicate the flow of the image data photographed by the user.

Referring to FIG. 5, a user 200 buys a digital camera 10 at, for example, a store 300 selling the digital camera 10 such as a convenience store. It is herein assumed that there are a plurality of selling stores 300. The user 200 returns the used digital camera 10 to the store 300 he/she bought it or another store 300 such as another convenience store. At this time, the user 200 receives a duplicate of the display portion showing thereon a password and address at which the photographed images are available, i.e., the portion provided on the back of the outer-housing portion 10*b* of the digital camera 10. The returned digital camera 10 is collected at a distribution center 350. The outer-housing portion 10*b* is first removed from the collected digital camera 10. Then, the digital camera 10 is electrically connected to a transmitting terminal of the distribution center 350, so that the photographed image data is transmitted to the server of an image station 50. For example, this image station 50 may be Sharp Space Town (hereinafter, referred to as SST), Sharp Corporation's Internet homepage.

It is herein assumed that the image station 50 is set so that it can receive the image data according to a predetermined communication protocol.

A proper distribution center 350 transmits image data according to a correct communication protocol. Therefore, when the proper distribution center 350 transmits image data, a flag such as fraudulent or unauthorized connection as described later is not set. The user can receive a service as described below at the image station 50 such as STT. Thus, the user can view and download the photographed images.

After transmission of the images, the digital camera body 10*a* is collected at a reuse center 402 of a manufacturer 400 of the digital camera 10 (e.g., Sharp Corporation), and sent to a recycling production factory 401. In the recycling production factory 401, the battery 20, external appearance, basic camera function of the digital camera body 10*a*, lens 11 and the like are examined, and the data stored in the memory 18 is cleared. Then, the outer-housing portion 10*b* is replaced with a new one, and a new password is recorded. Thus, the resultant digital camera 10 is shipped again.

If failed the examination, the digital camera body 10*a* is disassembled, and the upper and lower cabinets 22 and 23 are recycled. Reusable components (such as CCD 12, shutter 16 and substrate 21) are examined and washed for reuse.

The shipped digital camera 10 is sent to the store 300 such as a convenience store through the reuse center 402 and distribution center 350.

Note that the store 300 such as a convenience store may also serve as distribution center 350.

Figure 6:
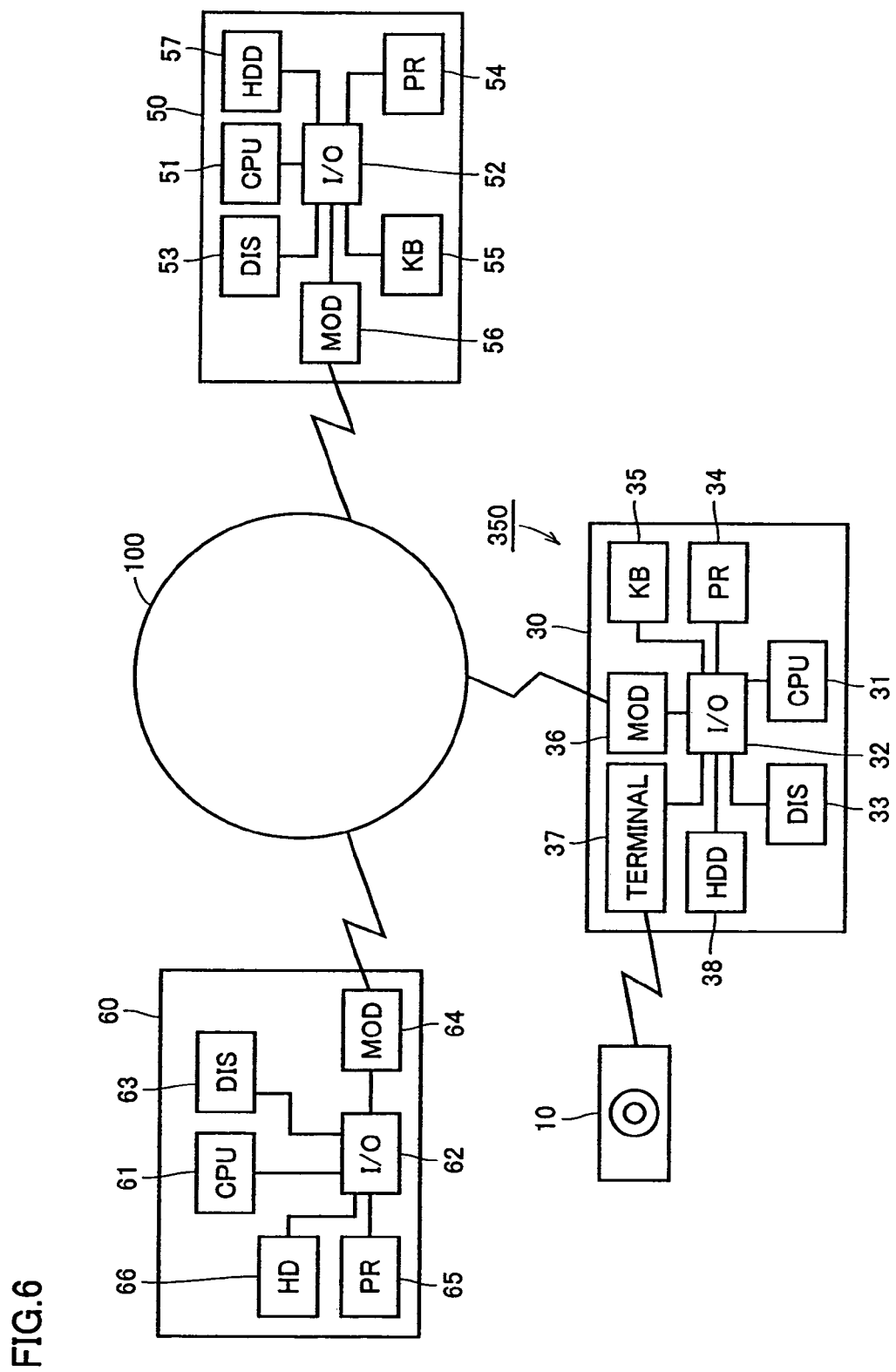
FIG. 6 is a schematic diagram showing the flow of image data in the digital camera collecting system to which the present invention is applied.

Hereinafter, a specific image data flow will be described. FIG. 6 is a schematic diagram showing the specific image data flow.

Referring to FIG. 6, the distribution center 350 serving as a collecting center of the digital camera 10 is provided with a transmitting apparatus 30. The transmitting apparatus 30 is an apparatus for transmitting image data photographed by the user with the digital camera 10 to the image station 50 such as SST over a network 100 such as the Internet.

After receiving the returned digital camera 10, the distribution center 350 transmits the image data to the image station apparatus 50 through the transmitting apparatus 30.

The transmitting apparatus 30 includes a terminal portion 37 connected to the digital camera 10 for receiving images from the digital camera 10, a modem 36 for transmitting the image data received through the terminal portion 37 to the image station apparatus 50 over the network 100, a hard disk 38 for temporarily storing the image data photographed with the digital camera 10, and a CPU (Central Processing Unit) 31 for controlling the whole transmitting apparatus 30. The transmitting apparatus 30 includes a regular keyboard 35, a display portion 33 and a printer 34 in addition to the above-mentioned elements. These elements are connected to each other through an I/O (Input/Output) interface 32.

Figure 7:
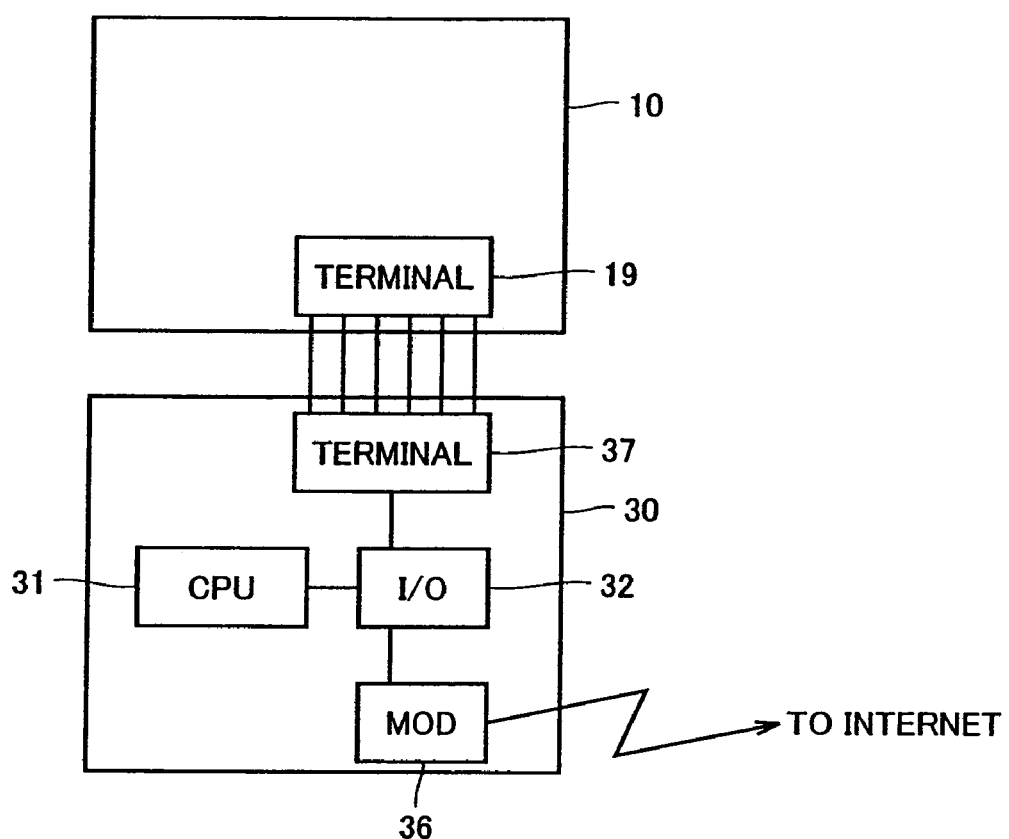
FIG. 7 is a schematic diagram showing the state of connection between a transmitting apparatus and a digital camera.

FIG. 7 is a schematic diagram showing connection between the digital camera 10 and transmitting apparatus 30. Referring to FIG. 7, the transmitting terminal 19 of the digital camera 10 is electrically connected to the terminal portion 37 of the transmitting apparatus 30 by using, for example, a plug and a jack. Through this connection, the photographed data stored in the memory 18 of the digital camera 10 is transmitted to the image station apparatus 50 over the network 100.

It is assumed that the plug and jack used for the connection has such shapes that are compatible with the well known compact plug, that is, a so called mini plug (EIAJ RC-6701A standard), and that the plug and jack are mounted on a transmission terminal 19 of digital camera 10 and a terminal portion 37 of the transmitting apparatus 30.

Note that the elements of the transmitting apparatus 30 that are not closely related to the image transmission are omitted in FIG. 7.

At the time of transmission from digital camera 10 to transmitting apparatus 30, the following data are transmitted. Namely, date of transmission, name of transmitter, name of transmitting store, number of digital camera 10 (same number as the home page address on which the picked-up image is released), password (identification number corresponding to the release address), data indicating which image data are of which number. The data may not be limited to image data, and when voice, sound and the like are recorded at the time of image picked-up, the voice or sound data may also be transmitted.

Flag information may be transmitted. The flag information as used herein refers to information of a selling-area identification code, unauthorized disassembly flag, unauthorized connection flag, information on the history of usage and the like. The selling-area identification code as used herein refers to a code having information on a selling area of the digital camera 10. The unauthorized disassembly flag as used herein refers to a flag that is set in response to the user's unauthorized disassembly of the digital camera 10, and the unauthorized connection flag refers to a flag that is set in response to the user's unauthorized connection. The information on the history of usage as used herein includes a power-supply period of the battery and the number of photographed images. These flags will be described later in detail.

Referring back to FIG. 6, the image station apparatus 50 will now be described. The image station apparatus 50 includes a CPU 51 for controlling the whole image station apparatus 50, a modem 56 for transmitting and receiving data to and from the network 100, a display portion 53, a keyboard 55, a printer 54, a hard disk 57 for storing the image data received over the network 100, and an I/O interface 52 for connecting these elements to each other.

The image station apparatus 50 receives the image data photographed with the digital camera 10 over the Internet, and stores the received data in the hard disk 57 at a prescribed address in connection with the password of the digital camera 10.

Note that the image data photographed with the digital camera 10 may be stored in the hard disk 38 of the transmitting apparatus 30 so as to be displayed on the display portion 33 as requested from the user who bought the digital camera 10, and printed with the printer 34 as required.

The image station apparatus 50 includes the display portion 53 and printer 54. Therefore, the images may be displayed on the display portion 53 and printed with the printer 54 as requested from the user when visiting the image station apparatus 50.

Hereinafter, a method for viewing an image photographed by the user with the digital camera 10 that he/she bought will be described.

Referring to FIG. 6, the user accesses the image station apparatus 50 by using a user's personal computer 60 connected to the network 100, in order to view the images he/she photographed.

The user's personal computer 60 includes a CPU 61 for controlling the whole personal computer 60, a display portion 63, a modem 64 for connecting to the network 100, a printer 65, a storage device 66 such as a hard disk, and an I/O interface 62 for connecting these elements to each other.

The user accesses the image station apparatus 50 by designating a URL on the network 100 such as the Internet through the user's personal computer 60.

It is now assumed that the user knows the URL and password of the homepage address of the image station apparatus 50 as described in connection with FIG. 1B by scratching when he/she returned the digital camera 10 to the store 300 such as a convenience store.

Figure 8A:
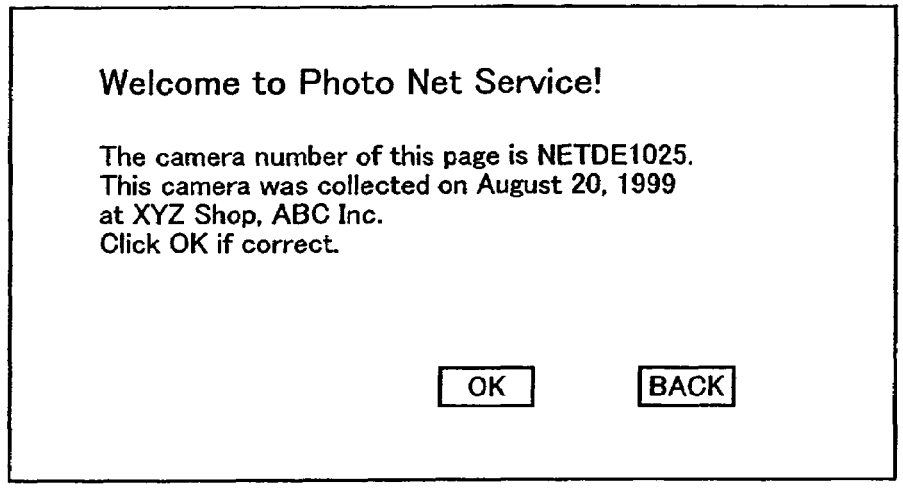
FIGS. 8A and 8B shows displays given when an image station apparatus is accessed.
Figure 8B:
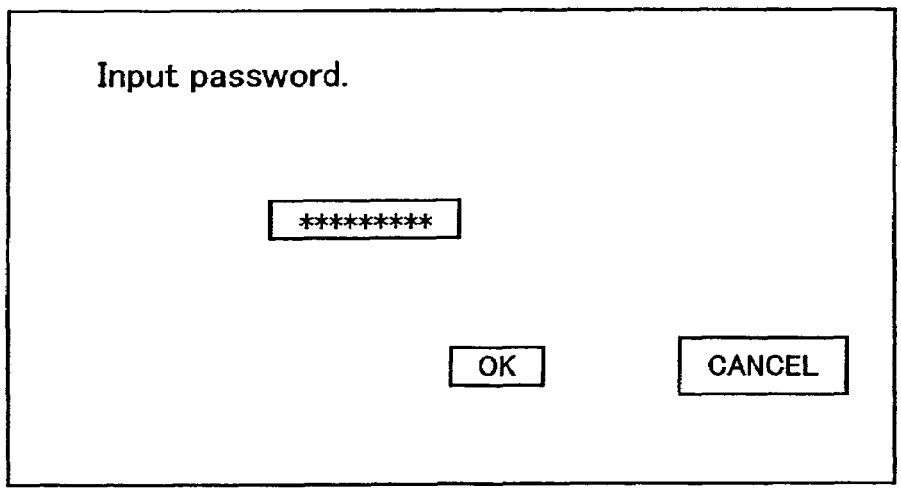

FIG. 8A is a diagram showing a display on the display portion 63 of the user's personal computer 60 upon accessing the Internet using the above-mentioned data. As shown in FIG. 8A, such an image display service for the digital cameras suitable for collection is herein referred to as photo net service. When the user accesses the image station apparatus 50 by using the user's personal computer 60, specific data such as the date and the store at which the camera was collected are displayed. The user clicks OK on the screen if the contents displayed on the screen correspond to the digital camera 10 that he/she used. Then, the display of FIG. 8B appears on the screen. The user inputs a password as described earlier, and then clicks OK.

If the input password is correct, the image station apparatus 50 accesses the hard disk 57 at a specific address stored in connection with the password, and displays the image data stored at the address on the display portion 63 of the user's personal computer 60 over the network 100.

When the user accesses the Internet, the list of photographed images is displayed. In this state, the user can proceed to various services such as editing and downloading of the photographed images and image synthesis service.

Figure 9:
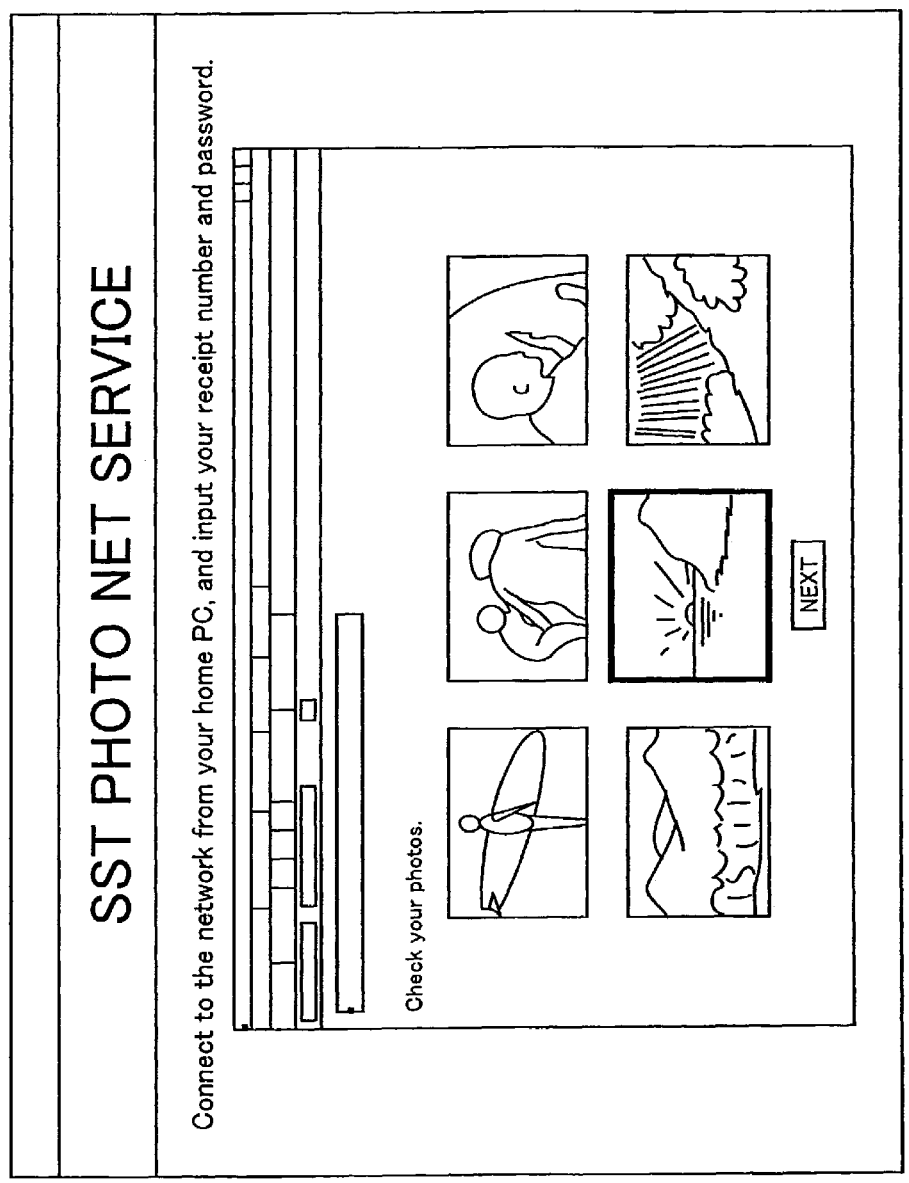
FIG. 9 shows a state in which the picked-up images are displayed.

FIG. 9 is a diagram showing an exemplary display of the photographs on the display portion 63 of the user's personal computer 60 when the input password is correct.

As shown in FIG. 9, a plurality of images are sequentially displayed on the screen. Note that enlargement/reduction of the image and other desired image processing may be conducted by clicking an image of interest.

Figure 10:
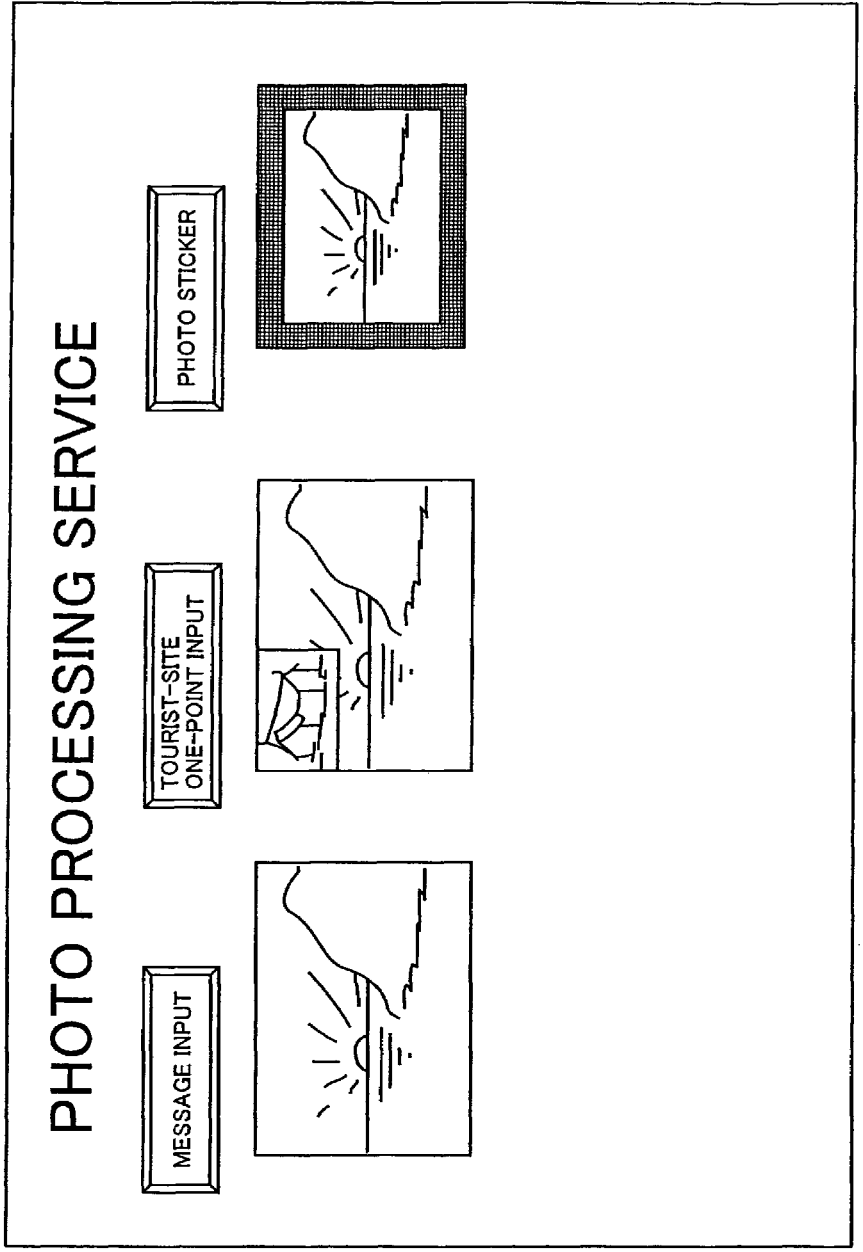
FIG. 10 shows a display screen of the photo processing service.

FIG. 10 is a diagram showing an exemplary screen displaying such a photo-processing service. For example, as shown in FIG. 10, message input and tourist-site one-point input can be made to each photograph, and also, a photo sticker can be made based on the photograph.

Note that tourist-site one-point input as used herein refers to a service to display a tourist site on a part of the photographed image. More specifically, the digital camera 10 that the user purchased has pre-stored information on the purchase place in the memory 18, so that the purchase place can be specified from the pre-stored information in the memory 18. Thus, a famous sightseeing spot in that area is displayed on a part of the photographed image.

Hereinafter, fraud prevention, that is, prevention of an unauthorized use, will be described. This is the operation conducted in the control portion 14 of FIG. 4 when the user has fraudulently disassembled the digital camera. The control portion 14 conducts the following processing in response to the user's unauthorized disassembly:

(1) The phototransistor (which may be a photo-interpreter) 17 senses the user's unauthorized disassembly by sensing the outside light, thereby erasing the photographed data stored in the memory 18.

(2) The phototransistor 17 senses the user's unauthorized disassembly by sensing the outside light, thereby setting an unauthorized disassembly flag on the memory 18. This flag is sent as information during data transmission to the transmitting apparatus. This data are used to warn or charge the user against his/her misuse. This processing may be conducted at the distribution center 350 provided with the transmitting apparatus 30, or may be conducted when the user accesses the image station apparatus 50.

Figure 11A:
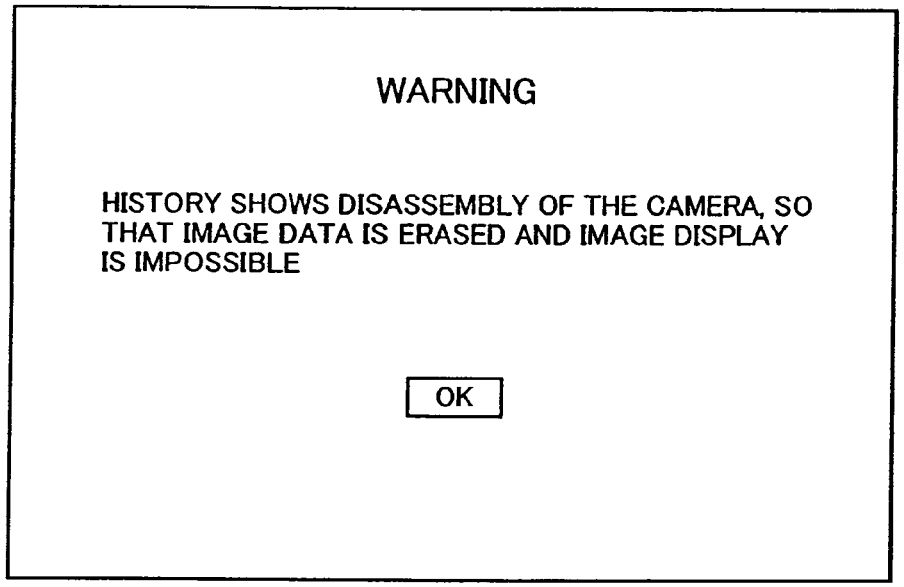
FIGS. 11A and 11B show examples of the display on the user side, after an unauthorized processing.

FIG. 11A shows an example of the display on the user side, when the user accesses to the access image station apparatus 50 after the unauthorized operation.

Figure 11B:
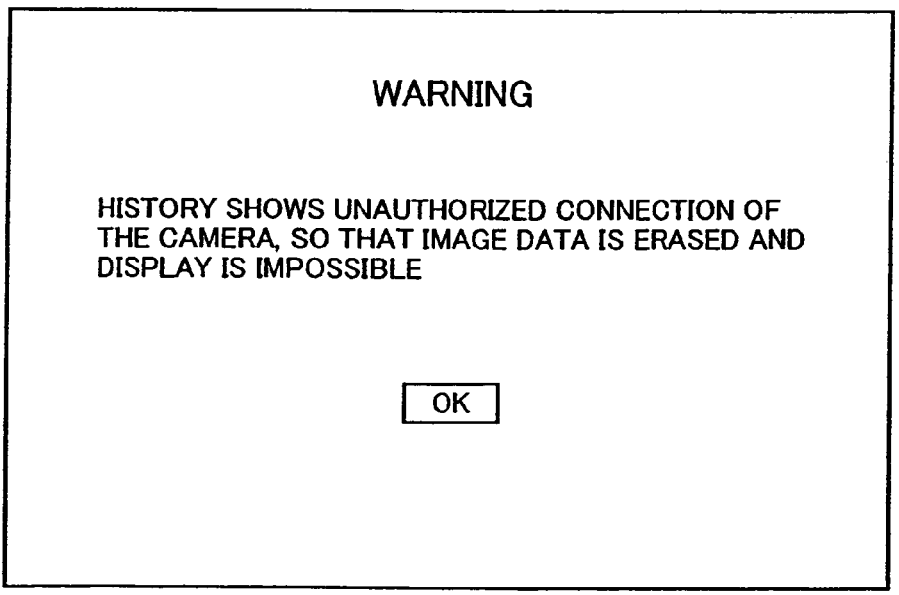

FIG. 11B shows an example of the display on the user side, when the user accesses to the access image station apparatus 50 after the unauthorized operation.

FIG. 11A also shows a display screen corresponding to the above described example (2). In this manner, the fact of unauthorized disassembly of the camera is noticed, and the user is asked to select accounting process, if he/she wishes to have the display of the images. As a method of accounting process, well-known method such as payment by a credit card, remittance or the like may be possible. The approach is not limited to the present embodiment. For example, only the warning notice may be displayed and the original images may be displayed.

In this case, the control proceeds in the following manner.

(1) A prescribed communication acknowledgement process is performed. When an unauthorized connection is found, the contents of memory 18 are erased.

(2) A prescribed communication acknowledgement process is performed. When an unauthorized connection is found, an unauthorized connection flag is set on memory 18, and transmitted as information, at the time of image transmission.

Figure 12:
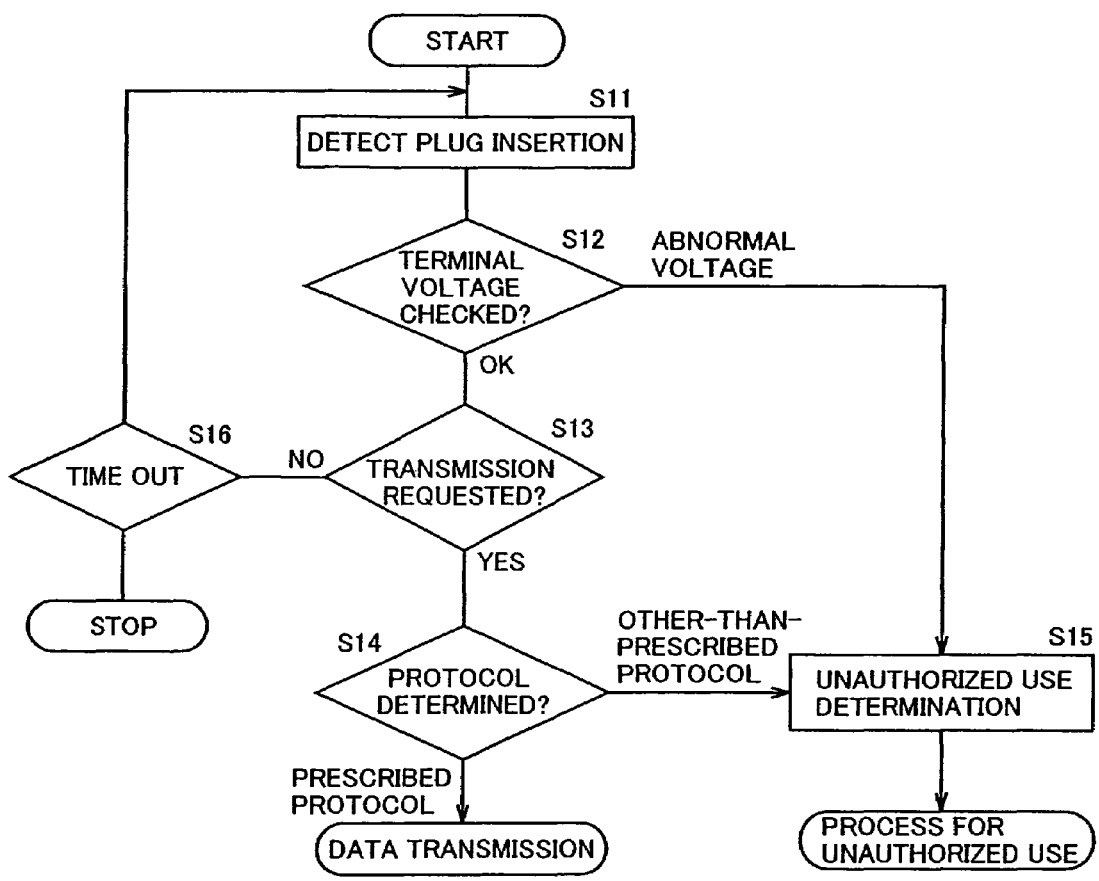
FIG. 12 shows an example of a communication acknowledgement procedure.

FIG. 12 shows an example of the communication acknowledgement process. Referring to FIG. 12, when insertion of a plug to transmission terminal 19 is detected (step S11, hereinafter "step" will be omitted), a voltage generated at the terminal is checked, so as to determine whether it is a prescribed voltage (S12). When an abnormality is detected, it is considered an unauthorized connection (S15), and the process (1) or (2) above takes place. When it is determined that a prescribed protocol is followed (OK in S12, S13, S14), the data picked-up by the digital camera is transmitted in accordance with a prescribed communication protocol.

(3) When it is not connected to a normal transmission terminal or the protocol is not the normal communication protocol, an unauthorized connection flag is set on memory 18 and transmitted as information, at the time of image transmission.

Determination of the communication protocol will be described in the following.

Figure 13:
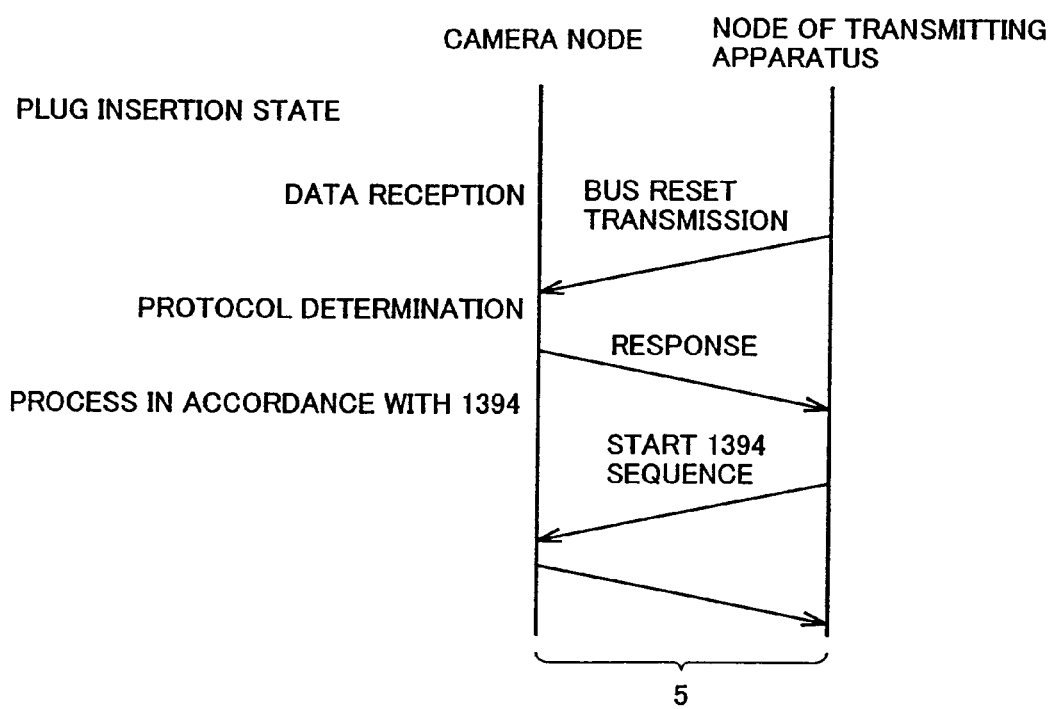
FIG. 13 shows a sequence of processing between a digital camera and a transmitting terminal.

FIG. 13 shows a sequence of signal transmission between transmission terminal 19 of digital camera 10 and transmitting apparatus 30. The description is for an example in which IEEE-1394 standard is used as the protocol and the nodes correspond thereto. A plug has been already inserted to the node of transmission terminal 19 of digital camera 10, to be ready for reception of a signal from a node of the transmitting apparatus through a transmission path. When a signal in accordance with IEEE1394, such as bus reset signal, is received at the node of transmission terminal 19 from the node of the transmission apparatus, protocol determination is made by a protocol determining portion, not shown, on the received signal. If the result of determination indicates that the protocol is in accordance with IEEE-1394, control portion 14 performs a response operation in accordance with IEEE-1394. Thereafter, signal transmission sequence in accordance with IEEE-1394 starts between the nodes.

The information (2) and (3) above is used to notify, as an alarm, that an unauthorized connection was made by the user, or to perform the accounting process, as already described.

Figure 14A:
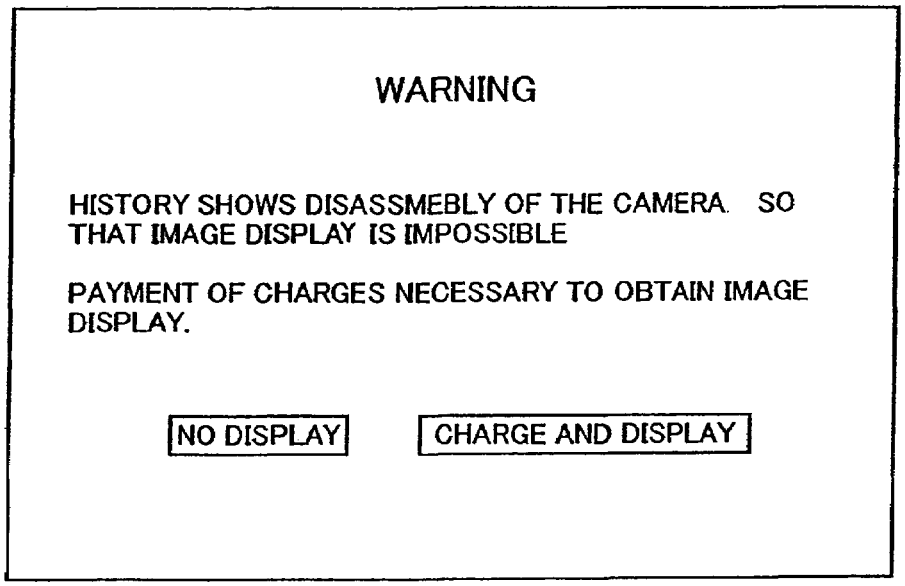
FIGS. 14A and 14B show examples of display on the user side after an unauthorized processing.
Figure 14B:
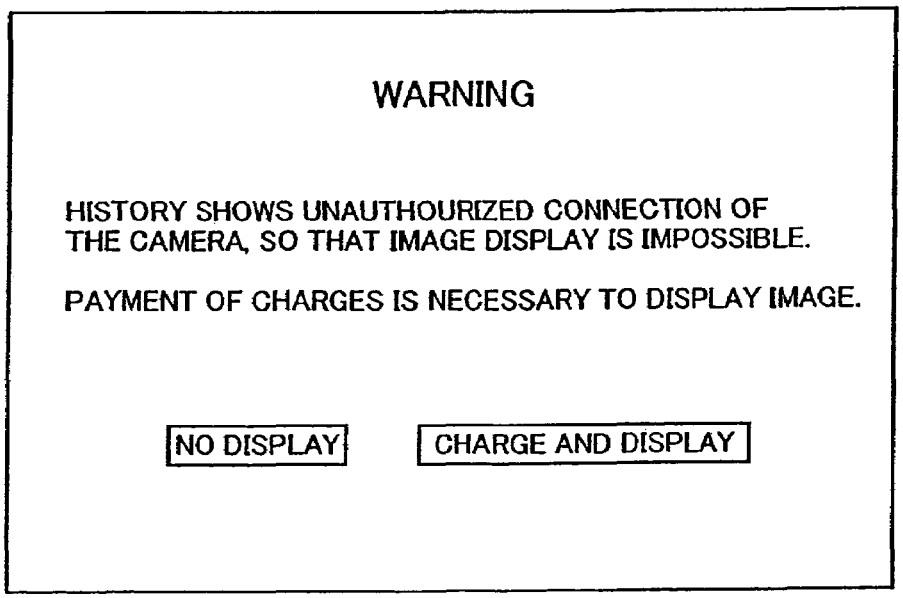

When a user accesses the access image station apparatus 50 after the above described unauthorized disassembly, a display such as shown in FIG. 14A appears on the personal computer of the user, for example. When the unauthorized connection described above is made, the display shown in FIG. 14B appears. In this manner, when there is an unauthorized disassembly or unauthorized connection of the camera, a warning is given, and when the user wishes to have the image displayed, he/she is asked to select the accounting process. As to the method of accounting, payment by a credit card, remittance or other known method may be used. The present embodiment, however, is not limiting, and only the warning may be given and the original images may be displayed.

Note that the scratch-type password is not necessarily provided on the outer-housing portion 10b of the digital camera 10. The password may be provided on, for example, a not-shown packaging film packaging the digital camera 10 when the user buys the digital camera 10. Alternatively, the password may be provided both on the packaging film and outer-housing portion 10b of the digital camera 10, so that one on the digital camera 10 can be kept by the store receiving the returned digital camera 10, whereas the other on the packaging film can be kept by the user.

For the purpose of energy saving, the operation-waiting time of the shutter 16 may be counted so as to turn off the main switch 15 automatically after a prescribed time period.

For the users who do not have a personal computer, printer and the like, an image display device capable of connecting to the image station 50 may be installed at the distribution center 350 and selling stores 300 such as convenience stores for selling and collecting the digital camera 10, so that the image station 50 may deliver the data thereto.

In this case, the image station 50 can deliver the images to any image display device. Therefore, the user can view the images on the image display device located at a desired distribution center 350 or selling store 300 such as a convenience store. Accordingly, in the case where the user bought a digital camera, photographed and returned it while traveling, the user can view the photographed images at the distribution center 350 or store 300 such as a convenience store located near his/her house.

Figure 15:
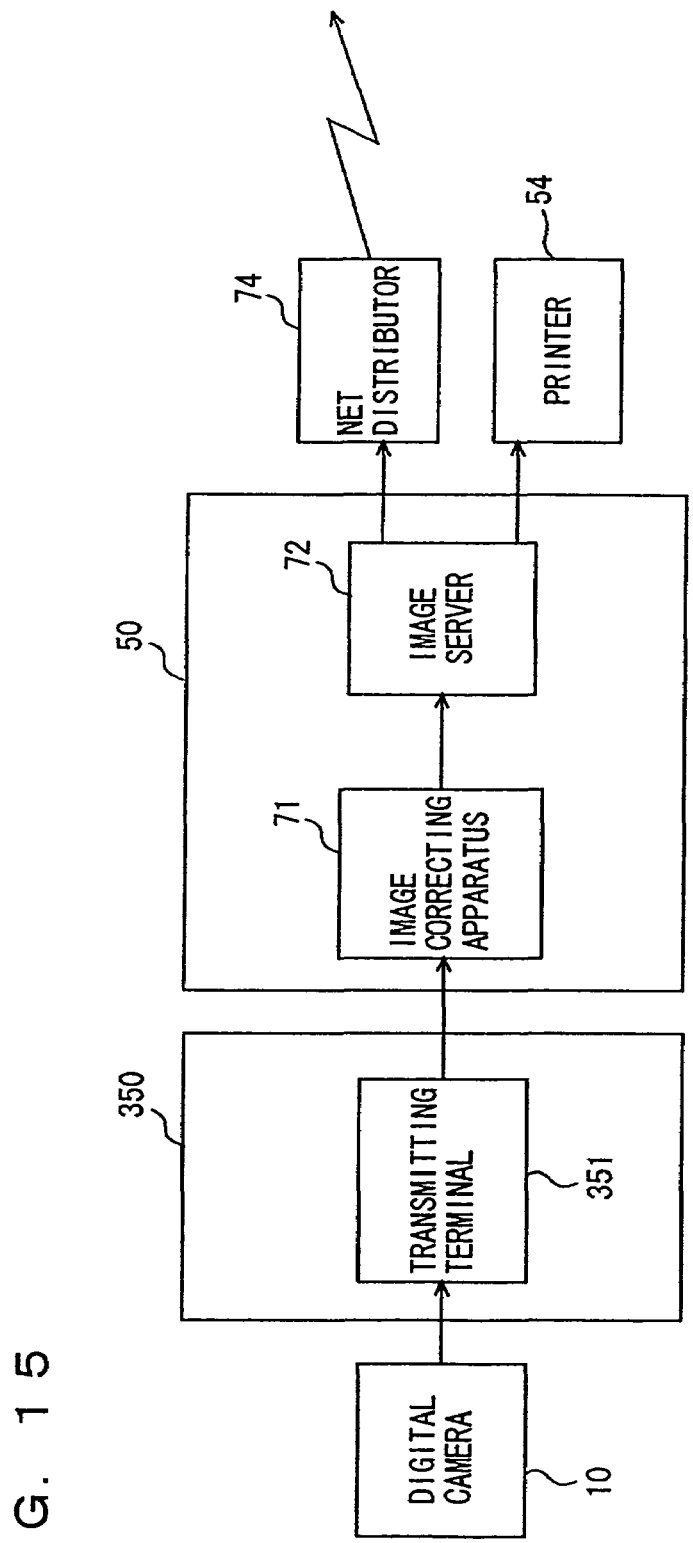
FIG. 15 shows the flow of image data transmitted to the image correcting apparatus to which the present invention is applied.

FIG. 15 is a block diagram representing the flow of image data to the image station 50, in which the image processing apparatus in accordance with the present invention is incorporated. In this example, the data transmitted from a transmission terminal 351 such as a modem 36 shown in FIG. 6 to image station 50 include photograph image data only.

Referring to FIG. 15, digital camera 10 is transmitted through transmission terminal 351 of a distribution center 350 to image station 50. Image station 50 includes an image correcting apparatus 71 and an image server 72 such as a hard disk 57 shown in FIG. 6. Image correcting apparatus 71 performs correction of aberration and unevenness in brightness, on the transmitted image data. As the characteristic of lens 11 used for digital camera 10 has already been stored in the memory of image correcting apparatus 71, the image correction can be done easily in a digital manner.

The image corrected in this manner is transmitted to image server 72. Thereafter, using a net distributer 74 such as a modem 56, the data are distributed over a network such as the Internet, or printed out by a printer 54.

An example of the image correcting process performed by the image correcting apparatus 71 in image station apparatus 50 will be described in the following.

Figure 16:
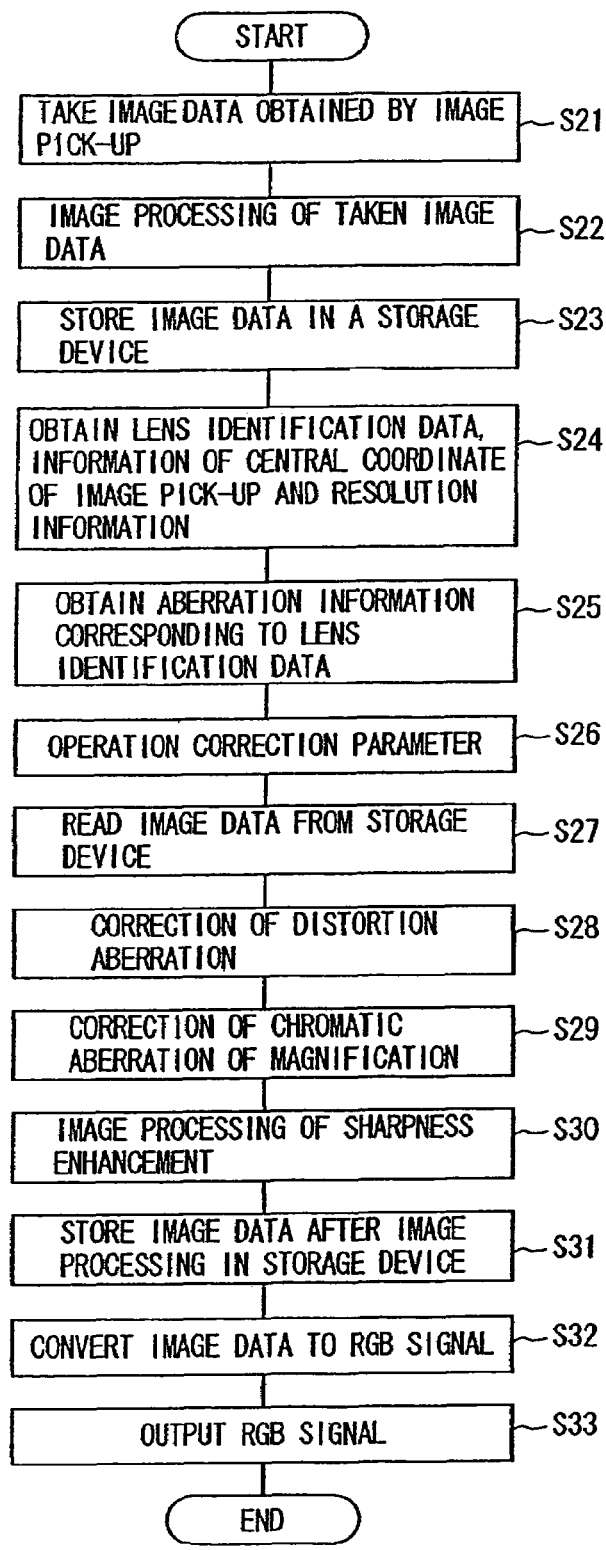
FIG. 16 shows an example of the image correcting process.
Figure 17:
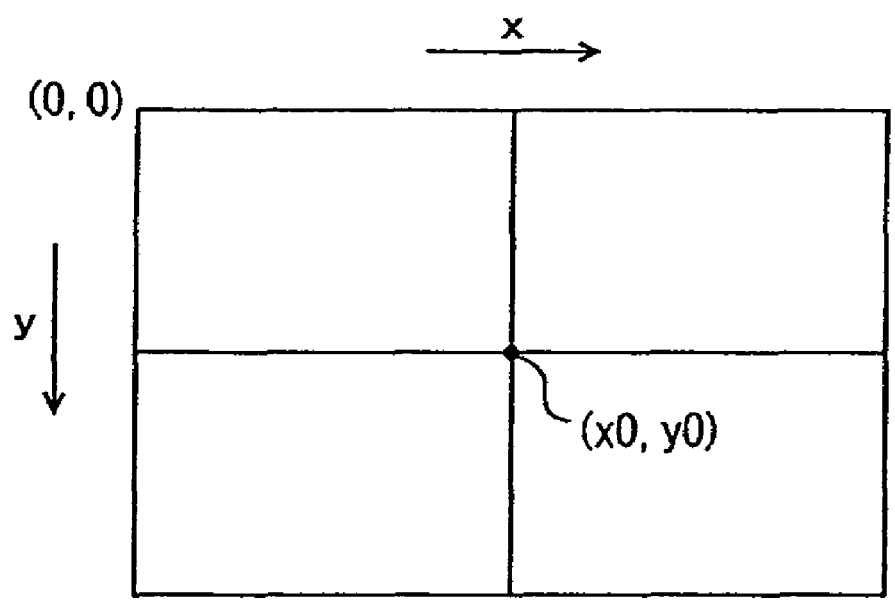
FIG. 17 shows a two-dimensional coordinate system used for image correction.

FIG. 16 is a flow chart showing an example of the process. Referring to FIG. 16, first, the image correcting apparatus takes in the transmitted image data (including brightness data Y and color difference data Cr, Cb) (S21). In the next step S22, color balance adjustment, contrast adjustment (color gradation processing), dark correction, defective pixel correction, shading correction and the like are performed on the image data, in accordance with well-known method including LUT and matrix (MTX) operation. In such an image processing as described above, YC data is developed to a virtual two-dimensional coordinate system (x, y) such as shown in FIG. 17, and image processing is performed on the YC data corresponding to each pixel. By the image processing described above, for each of the color difference data Cr and Cb and brightness data Y, resolution information in each of the X and Y directions of FIG. 17 and the coordinates (x0, y0) of the center of image pick-up in the two-dimensional coordinate system of FIG. 17 are obtained.

The image data after the image processing are stored in a storing portion 84 (not shown) (S23), identification data of the lens of the digital camera stored in advance, the information of the coordinates (x, y) of the center of image pick-up, and resolution information along the x and y axes for each of the color difference data Cr, Gb and brightness data Y are taken from a pre-processing portion 82 to a correction parameter operating portion 80.

Aberration information corresponding to the aforementioned identification data of the lens thus taken is read out from a memory portion, not shown (S25), and in next step S26, a process of operating a correction parameter is performed.

In the process of operating the correction parameter, a distortion aberration correction parameter for correcting distortion of the image resulting from the distortion aberration of the lens that is used for the distortion aberration correcting process, which will be described later, is calculated by a known method, for each pixel in the two-dimensional coordinate system shown in FIG. 17.

In S27, the image data stored in S23 are read from the storing portion. In S23, when the image data have been stored in a compressed manner, the compressed image data are decompressed after reading, so as to recover the image data before compression.

Figure 18A:
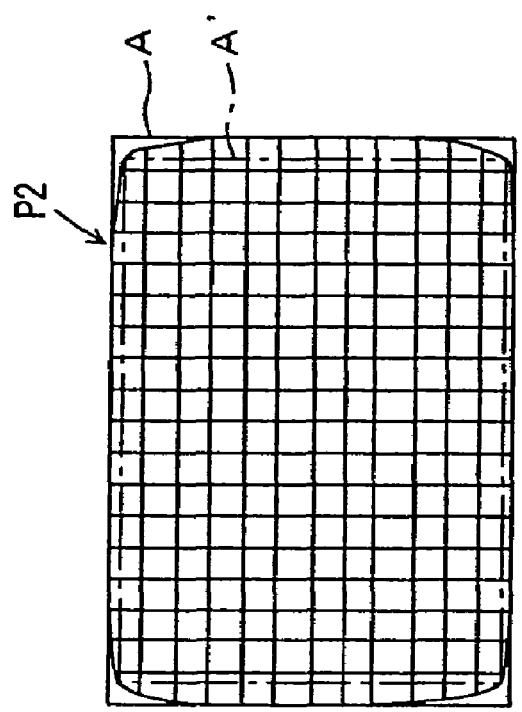
FIGS. 18A and 18B show the state of image distortion and the state of correction therefor.
Figure 18B:
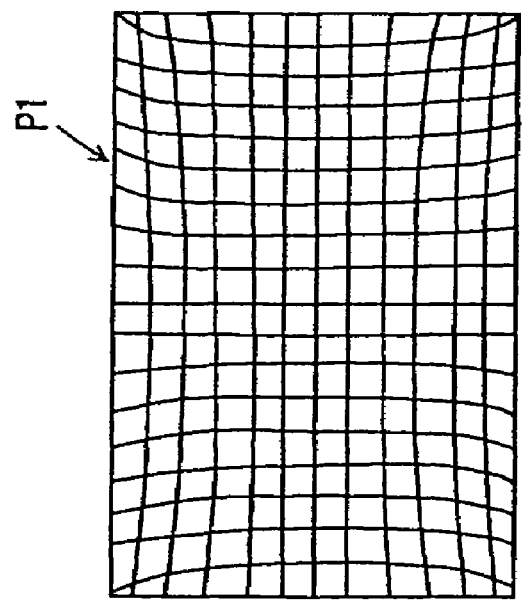

In S28, distortion aberration correcting process is performed by the distortion aberration correcting portion. For the object data among Y, Cb and Cr, correction of image distortion resulting from distortion aberration is performed pixel by pixel, using the distortion aberration correction parameter obtained in S26. By this operation, image data representing an image that has an inwardly convex distortion toward the periphery of the image such as shown in FIG. 18A can be corrected to image data representing an image free of the distortion as shown in FIG. 18B.

More specifically, for the object data, enlarging or reducing process (image density transforming process) is performed pixel by pixel, in accordance with the magnification of enlargement/reduction. Thus, the image area A' shown by a chain dotted line of FIG. 18B is enlarged to the image area A. The data outside the effective area, that is, data corresponding to the area outer than the image area A of FIG. 18B, are discarded. Thus, image data representing an image with the image distortion resulting from distortion aberration corrected can be obtained for the object.

In S29, a subroutine for correcting chromatic aberration of magnification is executed by an R correcting portion for correcting chromatic aberration of magnification and a B correcting portion for correcting chromatic aberration of magnification. For each of R and B data, correction of blur resulting from chromatic aberration of magnification is corrected pixel by pixel, using the chromatic aberration of magnification correction parameter, obtained in step S26. Thus, image data representing an image with a blur are corrected to an image data representing an image free of the blur.

In S30, image processing of sharpness enhancement in accordance with brightness enhancement is performed by a sharpness enhancing portion, not shown.

Finally, in S31, image data including the brightness data Y' having only the aforementioned high frequency component amplified and color difference data Cr and Gb that have been subjected to correction of chromatic aberration of magnification are stored in a storing portion of image server 72. At this time, the image data may be compressed for storage.

As described above, using the correction parameter, distortion aberration and chromatic aberration of magnification are corrected for the image data input from a digital camera.

Therefore, even when an inexpensive lens having relatively large aberrations is used for image pickup by a digital camera, image data can be obtained in which distortion aberration and chromatic aberration of magnification corrected.

As a result, image quality of the output image can be made satisfactory, while the cost of the lens is suppressed.

Another example of the image correcting apparatus implementing the image processing apparatus in accordance with the present invention will be described. In the embodiment described above, the data transmitted from distribution center 350 to image station 50 has been only the picked-up image data.

In the present embodiment, not only the picked-up image data but also a lens ID (identification number) data of the digital camera are transmitted simultaneously.

Figure 19:
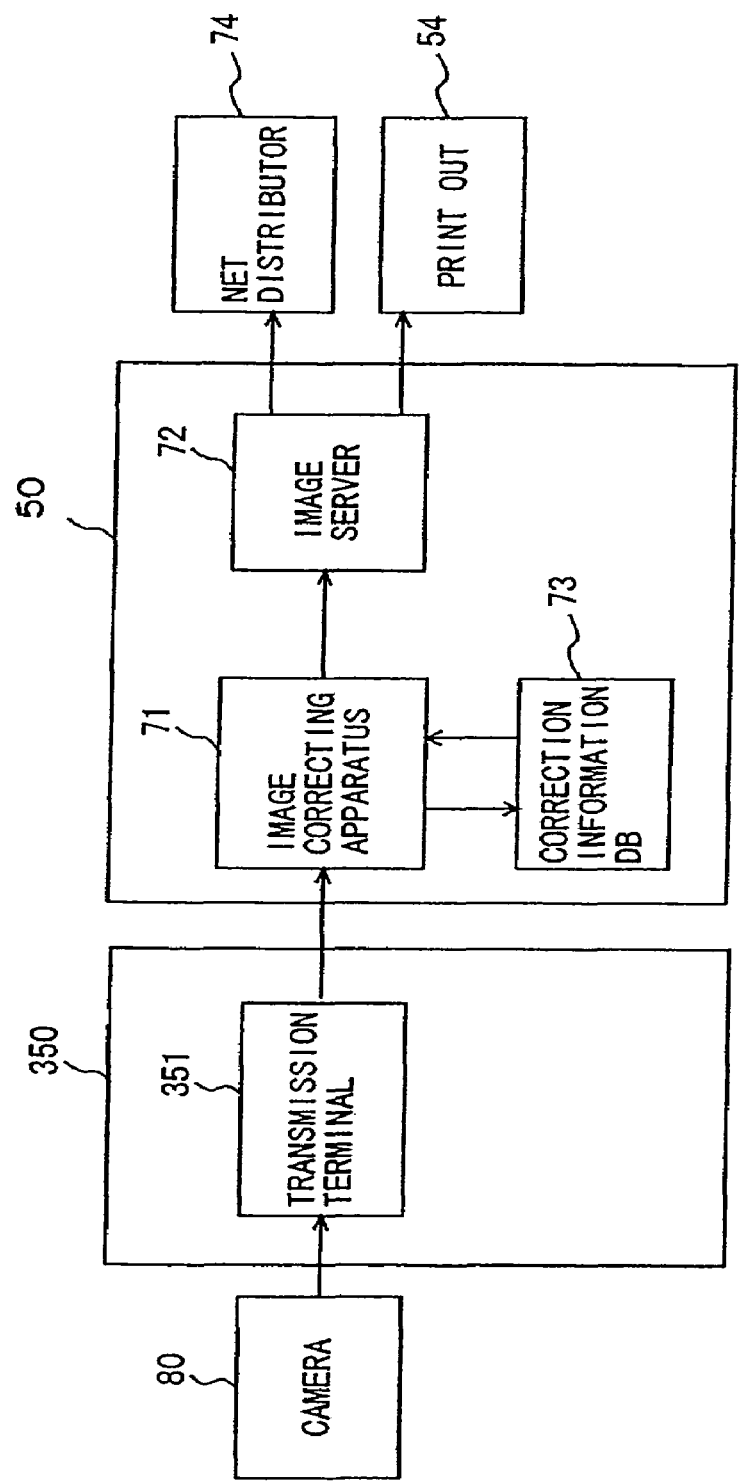
FIG. 19 shows another embodiment of the present invention.
Figure 20:
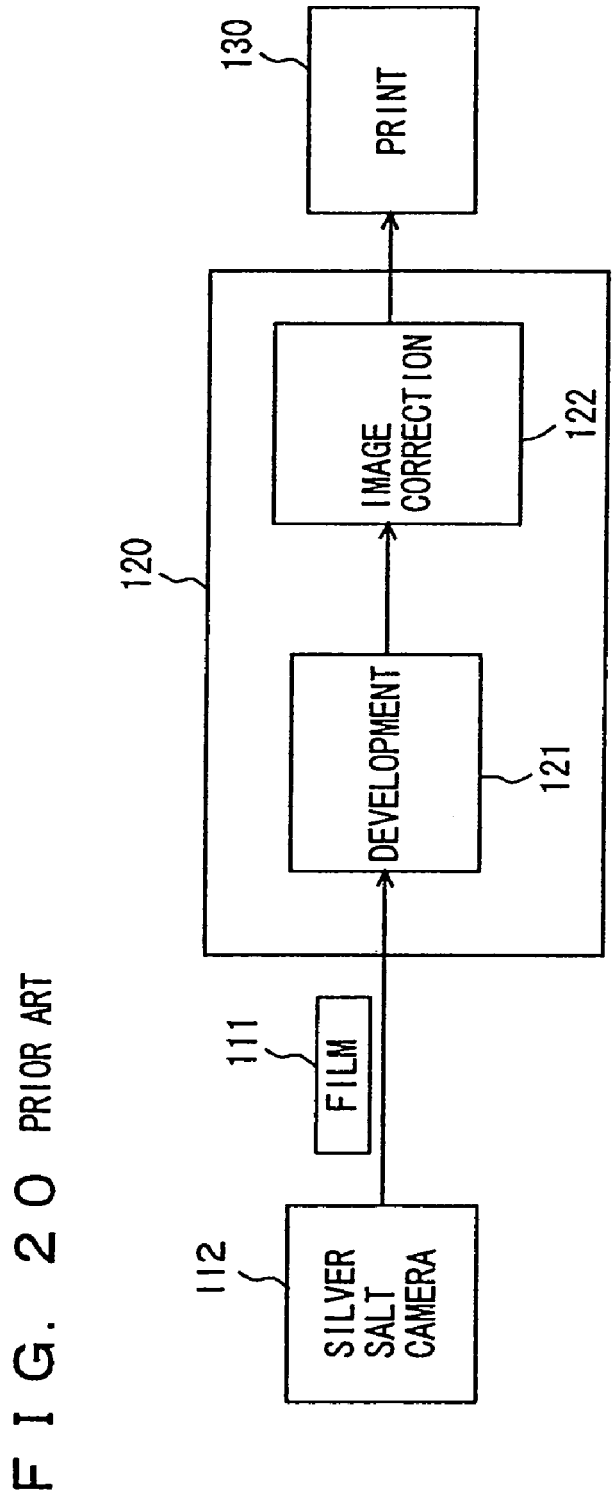
FIG. 20 shows a flow of image data for a silver salt camera.
Figure 21:
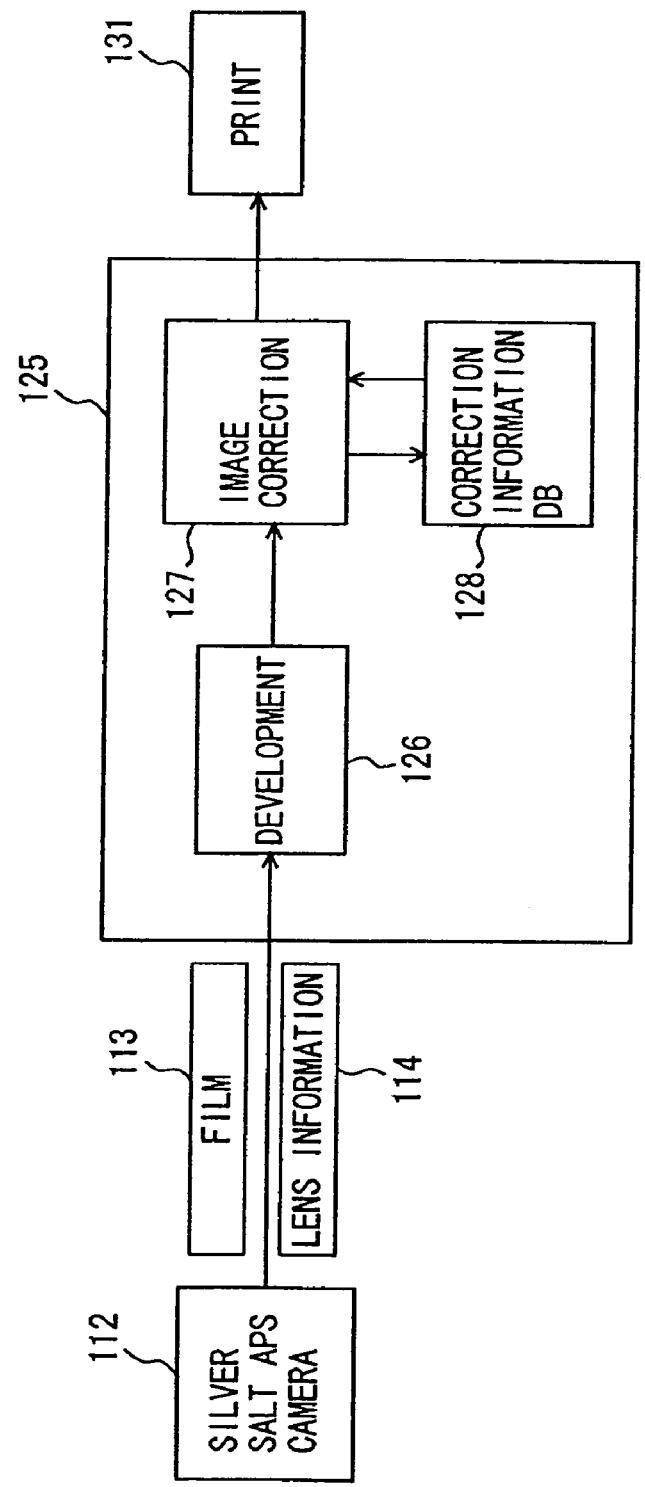
FIG. 21 shows a flow of image data for a silver salt APS camera.
Figure 22:
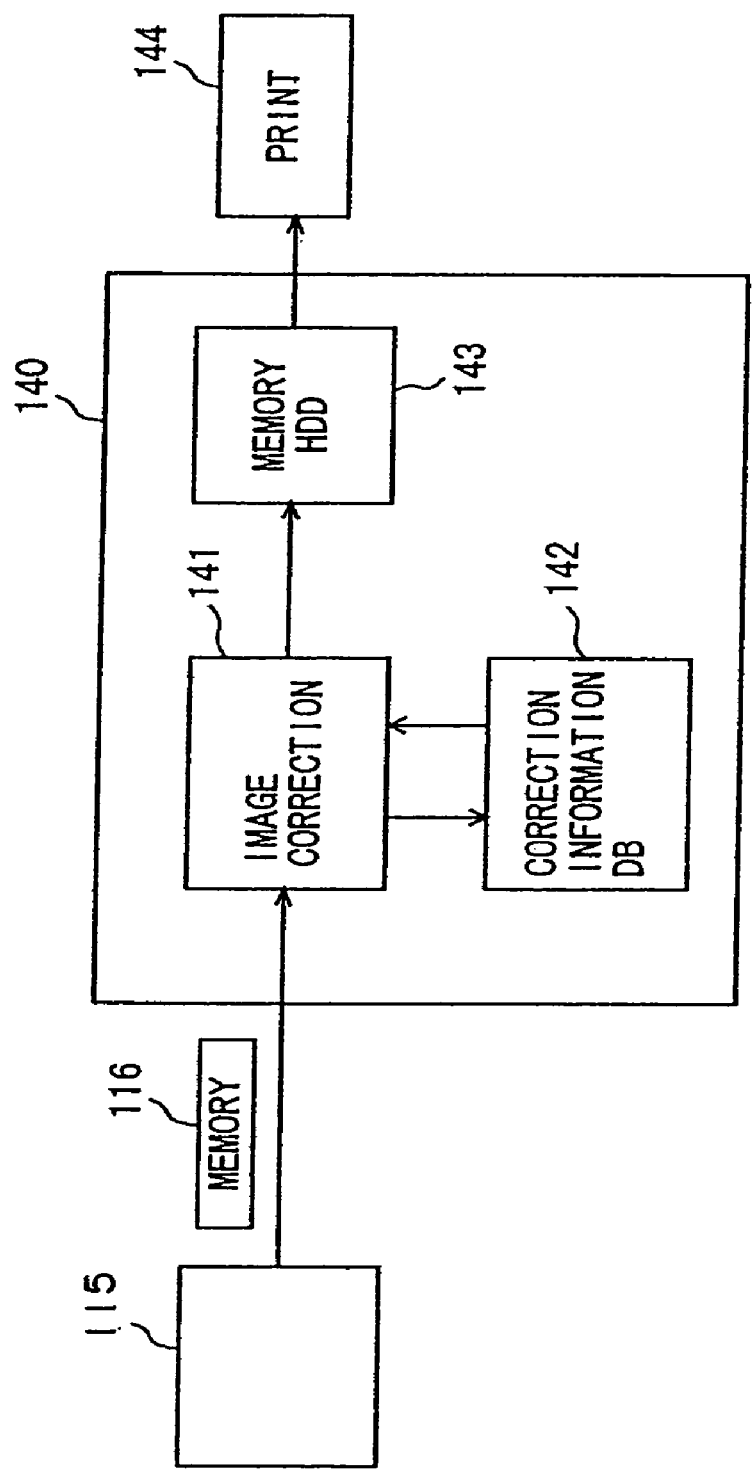
FIG. 22 shows a flow of conventional image data of a digital camera.

FIG. 19 is a block diagram showing the flow of image data and the lens ID data in accordance with the present embodiment. Referring to FIG. 19, a digital camera 80 has an ID of the lens system 11 that is accommodated in the digital camera 80. The lens ID is transmitted, together with the picked-up image data, from transmission terminal 351 to image station 50.

Namely, according to the present embodiment, an arbitrary lens including a zoom lens, an exchangeable lens or the like may be used as the lens.

In image station 50, similar to the above-described embodiment, image correcting apparatus 71 is provided. In the present embodiment, a correction information database 73 is connected to image correcting apparatus 71. Image correcting apparatus 71 searches for the lens ID transmitted from distribution sensor 35 in the correction information database 73, and obtains necessary correction information. Thereafter, image correction is performed in accordance with the correction information.

Except this point, the processing is the same as that of the above-described embodiment. Therefore, description thereof will not be repeated.

Though the image processing apparatus has been provided in the image station in the embodiments above, the image processing apparatus may be provided at the distribution center or a retail store.

As described above, when an image picked-up by the digital camera is viewed, the user views the image that has been automatically corrected. Therefore, user will not be conscious of the image correction.

Further, as the image is corrected appropriately for each lens, the user views an image of high image quality.

Though a digital camera has been described as an example above, the invention is also applicable to a digital video camera.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, comprising:
   an optical system;
   image processing means for processing an image of an object input through said optical system;
   a memory storing photograph data resulting from said image processing;
   a housing box accommodating said optical system, said image processing means and said memory;

detecting means for detecting disassembly of said housing box;

control means for performing a prescribed processing in response to a result of detection by said detecting means;

means for transmitting the photograph data stored in said memory to a prescribed photograph data storage device through a network; wherein said prescribed processing includes transmission of a prescribed signal to said prescribed photograph data storage device to give an alarm when said photographed image is viewed.

2. The digital camera according to claim 1, wherein said prescribed processing further includes erasure of recorded contents of said memory.

3. The digital camera according to claim 1, wherein a photographed image stored in the photograph data storage device can be viewed by accessing the photograph data storage device over the network by using access data that is unique to each digital camera.

4. The digital camera according to claim 1, wherein the network is the Internet.

5. The digital camera according to claim 1, wherein the camera is disposable.

6. The digital camera according to claim 1, wherein the camera or parts thereof is reusable.

7. The digital camera according to claim 1, wherein the detecting means comprises a phototransistor that can sense whether the camera has been disassembled based on incident light.

8. The digital camera according to claim 1, wherein the prescribed signal comprises a flag that prompts a message that the camera was disassembled without authorization.

9. The digital camera according to claim 1, wherein the prescribed signal comprises a flag that prompts a message that allows an unauthorized user to access the photograph data upon making a payment.

* * * * *